(12) United States Patent
Chiussi et al.

(10) Patent No.: US 6,608,813 B1
(45) Date of Patent: Aug. 19, 2003

(54) METHOD AND APPARATUS FOR ACHIEVING FAULT TOLERANCE IN PACKET SWITCHING SYSTEMS WITH INVERSE MULTIPLEXING

(75) Inventors: Fabio M. Chiussi, Long Branch, NJ (US); Denis A. Khotimsky, Eatontown, NJ (US); Santosh Krishnan, Eatontown, NJ (US)

(73) Assignee: Agere Systems Inc, Allentown, PA (US)

( * ) Notice: Subject to any disclaimer, the term of this patent is extended or adjusted under 35 U.S.C. 154(b) by 0 days.

(21) Appl. No.: 09/434,031

(22) Filed: Nov. 4, 1999

Related U.S. Application Data

(60) Provisional application No. 60/107,043, filed on Nov. 4, 1998.

(51) Int. Cl.[7] .......................... G01R 31/08; G06F 11/00; G08C 15/00; H04J 1/00
(52) U.S. Cl. ........................................ 370/218; 370/216
(58) Field of Search ................................. 370/218, 233, 370/416, 388, 392, 394, 411, 536; 340/825.5; 710/116; 375/260

(56) References Cited

U.S. PATENT DOCUMENTS

| | | | | |
|---|---|---|---|---|
| 4,470,112 A | * | 9/1984 | Dimmick | 710/116 |
| 4,631,534 A | * | 12/1986 | Franklin et al. | 340/825.5 |
| 4,704,606 A | * | 11/1987 | Hasley | 340/825.5 |
| 4,958,341 A | * | 9/1990 | Hemmady et al. | 370/352 |
| 5,140,582 A | * | 8/1992 | Tsuboi et al. | 370/416 |
| 5,179,556 A | * | 1/1993 | Turner | 370/233 |
| 5,293,378 A | * | 3/1994 | Shimizu | 370/474 |
| 5,764,624 A | * | 6/1998 | Endo et al. | 370/218 |
| 5,784,357 A | * | 7/1998 | Wolker et al. | 370/218 |
| 5,949,778 A | * | 9/1999 | Abu-Amara et al. | 370/388 |
| 6,026,092 A | * | 2/2000 | Abu-Amara et al. | 370/411 |
| 6,148,010 A | * | 11/2000 | Sutton et al. | 370/536 |

* cited by examiner

Primary Examiner—Wellington Chin
Assistant Examiner—Jamal A. Fox

(57) ABSTRACT

A preferred embodiment incorporates a core switching network including a plurality of input and output ports and a plurality of switching paths between the input and output ports. Preferably, a plurality of input controllers and output controllers are provided, with each of the input controllers being attached to a plurality of the input ports and each of the output controllers being attached to a plurality of the output ports. The core switching network also preferably is configured to receive a first flow of data packets from one of the input controllers and deliver a second flow of data packets to one of the output controllers, and the packet switching system is configured to restore the second flow of data packets despite a loss of information from at least one of the data packets upstream of the one of the output controllers so that the second flow has an order of remaining ones of the data packets corresponding to an order of the data packets in the first flow. Additionally, methods and apparatuses for checkpointing inverse multiplexed network connection traffic for recovering synchronization of the data are provided.

12 Claims, 32 Drawing Sheets

R = Regular
P = Painted
L = Leader

METHOD AND APPARATUS FOR ACHIEVING FAULT TOLERANCE IN PACKET SWITCHING SYSTEMS WITH INVERSE MULTIPLEXING

CROSS-REFERENCE TO RELATED APPLICATIONS

This application is based on and claims priority to U.S. Provisional Application Serial No. 60/107,043, filed Nov. 4, 1998. The foregoing priority document is incorporated herein by reference in its entirety.

BACKGROUND OF THE INVENTION

1. Field of the Invention

The present invention relates generally to the field of packet data networks, and, more particularly, to the application of inverse multiplexing in packet switching systems.

2. Description of the Related Art

Inverse multiplexing has long been known as a technique to implement a single high-capacity logical communication channel by using several lower-capacity communication channels, where distribution and aggregation of the traffic flow to and from individual communication links is transparent to the applications. A variety of such inverse multiplexing schemes for packet data networks were proposed and implemented such as incremental bandwidth on demand (BONDING), Multilink Point-to-Point protocol (Multilink PPP), Packet Striping and Inverse multiplexing for ATM (IMA), for example. The aforementioned techniques primarily are related to different operating environments, have different objectives, and can be classified in respect to splitting granularity, synchronous vs. asynchronous use of resources, and methods of differential delay compensation. However, aggregation of communication bandwidth through splitting, recombination, and sequencing is a feature that they have in common. Other common features include: operating on the point-to-point link and sensitivity to packet loss. The former means that the underlying lower capacity channels are in fact point-to-point links which do not contain contention points associated with switching nodes and, therefore, can be characterized by predictable delay and low delay variation. Furthermore, the splitting and recombination scheme may rely on the exclusive use of those links for the inverse multiplexing purposes. The latter implies that loss of just a single packet within the boundaries of the inverse multiplexed logical channel may cause loss of synchronization and lead to the necessity for some number of successfully delivered packets to be discarded as well. Discarding of the successfully delivered packets, in turn, is associated with the need to retransmit the packets later, causes reduction of throughput, and is a contributing factor of network congestion.

In recent years, it has become obvious that point-to-point inverse multiplexing does not address all the needs of modern packet data networks. While the market demands switches that are capable of terminating trunks of ever increasing bandwidth, the issue of scaling the port capacity becomes critical. Inverse multiplexing can potentially provide an economical way to interface the new higher-rate trunks with existing switches (or switching networks) that have ports operating at a lower rate.

However, the principles of inverse multiplexing applicable in the point-to-point environment can not be directly translated into the switching systems. First, in this case, splitting has to distinguish between multiple components of the incoming packet flow which are destined to distinct output ports of the switching system and carry different Quality of Service (QoS) requirements. Second, the presence of buffers within the boundaries of the logical link make the differential delays unpredictable and highly variable, as well as is associated with inherent probability of packet loss.

An improved inverse multiplexing scheme called switched connection inverse multiplexing, which presents a significant qualitative advancement over conventional point-to-point inverse multiplexing, has been proposed recently. This new switched connection inverse multiplexing scheme applies to any packet data network, operates on individual established network connections or flows, and allows inverse multiplexed packets of the selected network connections over network segments which contain switching nodes. The scheme is generally directed to a packet switching system including a plurality of input controllers and a plurality of output controllers attached to a core switching network. Each input controller and each output controller terminates a communication link that can carry a plurality of network connections (NCs). Each NC is received at a unique input controller and is routed through the core switching network to a unique output controller. The core switching network provides a plurality of switching paths between each input controller and each output controller such that the bandwidth of each individual switching path is smaller than the data rate of the communication links terminated by a controller, but the aggregate bandwidth of all the switching paths provided between a given pair of input and output controllers is approximately equal to the data rate of the terminated communication links.

The packet switching system processes NC requests for switched connections between the incoming communication links and the outgoing communication links. Non-multiplexed NCs are established through the core switching network in which the entire bandwidth of the NC is carried by a single switching path. Inverse multiplexed NCs are established through the core switching network in which the bandwidth of the NC is partitioned among a plurality of switching paths using weight values to determine the fraction of bandwidth to be allocated to each switching path, each portion of the NC traffic taking a separate switching path being referred to as a subconnection.

Every packet of an inverse multiplexed NC is assigned an inverse multiplexing tag, which contains a sequence number consistent within the subconnection, i.e., it reflects the number of packets belonging to every given inverse multiplexed NC transmitted over the same switching path, and a next path pointer, i.e., the identification of the switching path on which the following packet of the same inverse multiplexed NC will be transmitted. To enhance robustness of the scheme, the inverse multiplexing tag may optionally contain one or more i-th previous next path pointers, i=1, ..., n, the i-th previous next path pointer meaning the value of the next path pointer that has been carried by the i-th preceding packet belonging to the same subconnection.

The switched connection inverse multiplexing scheme successfully translates the resource aggregation principles from point-to-point link bandwidths to switch port capacities in a switching system. However, the issue of confronting packet loss remains critical. To eliminate preventable packet losses within the inverse multiplexed switching path and to transfer them to the input controller before the actual splitting point, the switched connection inverse multiplexing scheme employs ubiquitous back pressure applied through all stages of the core switching network from the output controller to the input controller. Still not all types of packet losses can be excluded by this method. If the back pressure to the input controller can not be applied or is ineffective at the specific location within the core switching network where loss can occur, or if packet losses are associated with random uncontrollable factors, such as the electrical glitches, packet memory faults, or interface errors, the packet re-sequencing engine may lose synchronization and be unable to restore the original order of the inverse multiplexed NC packets. In particular, if the number of packets from the same subconnection of the given inverse multiplexed NC which have been lost in a row exceeds n, i.e., the number of previous next path pointers contained in the inverse multiplexing tag, then restoring the packet order of the given inverse multiplexed NC becomes impossible.

Therefore, there is a need for improved methods and devices which address these and other shortcomings of the prior art.

SUMMARY OF THE INVENTION

The present invention generally is directed to a packet switching system which provides a fault tolerant extension of the switched connection inverse multiplexing scheme. In a preferred embodiment, the packet switching system incorporates a core switching network including a plurality of input and output ports and a plurality of switching paths between the input and output ports. Preferably, a plurality of input controllers and output controllers are provided, with each of the input controllers being attached to a plurality of the input ports and each of the output controllers being attached to a plurality of the output ports. Additionally, the core switching network is configured to receive a first flow of data packets from one of the input controllers and deliver a second flow of data packets to one of the output controllers, and the packet switching system is configured to restore the second flow of data packets despite a loss of information from at least one of the data packets upstream of the one of the output controllers so that the second flow has an order of remaining ones of the data packets corresponding to an order of the data packets in the first flow.

In accordance with another aspect of the present invention, a preferred embodiment of the packet switching system incorporates a core switching network including a plurality of input ports, a plurality of output ports, and a plurality of switching paths between the ports. Preferably, a plurality of input controllers are provided, with each of the input controllers being configured to receive a first flow of data packets, to partition the first flow of data packets into at least two sequences of data packets, and forward each of the sequences of data packets to a different one of the input ports. Additionally, a plurality of output controllers are provided, with each of the output controllers being configured to receive at least two sequences of remaining ones of the data packets from different ones of the output ports and to re-assemble the sequences of remaining ones of the data packets into a second flow of data packets. Preferably, the second flow has an order of the remaining data packets corresponding to an order of the data packets in the first flow despite a possible loss of at least one of the data packets within the core switching network.

In accordance with another aspect of the present invention, a core switching network is provided. In a preferred embodiment, the core switching network incorporates a plurality of input ports, a plurality of output ports, and a plurality of switching paths between the input and output ports. Means for delivering the data packets through the core switching network also is provided.

In accordance with still another aspect of the present invention, a method for resorting a flow of data packets in a packet switching system is provided. A preferred method incorporates the steps of assigning an inverse multiplexing tag to each of the data packets, saving the inverse multiplexing tag of each of the data packets discarded by the packet switching system, and resorting successfully delivered ones of the data packets based upon the inverse multiplexing tags of the successfully delivered ones of the data packets and the saved inverse multiplexing tags of the discarded data packets.

In accordance with yet another aspect of the present invention, a method for restoring a flow of data packets in a packet switching system is provided. A preferred method incorporates the steps of providing a first flow of data packets to a core switching network of the packet switching system, inserting a checkpoint into the first flow of data packets, providing a second flow of data packets from the core switching network, and utilizing the checkpoint to recover from a loss of information from within the core switching network so that the second flow has an order of remaining ones of the data packets corresponding to an order of the data packets in the first flow.

Other features and advantages of the present invention will become apparent to one of reasonable skill in the art upon examination of the following drawings and detailed description. It is intended that all such additional objects, features, and advantages be included herein within the scope of the present invention, as defined by the claims.

BRIEF DESCRIPTION OF THE SEVERAL VIEWS OF THE DRAWINGS

The present invention will be more fully understood from the accompanying drawings of various embodiments of the invention which, however, should not be taken to limit the invention to the specific embodiments enumerated, but are for explanation and for better understanding only. Furthermore, the drawings are not necessarily to scale, emphasis instead being placed upon clearly illustrating the principles of the invention. In the drawings.

DETAILED DESCRIPTION OF THE INVENTION

Figure 1:
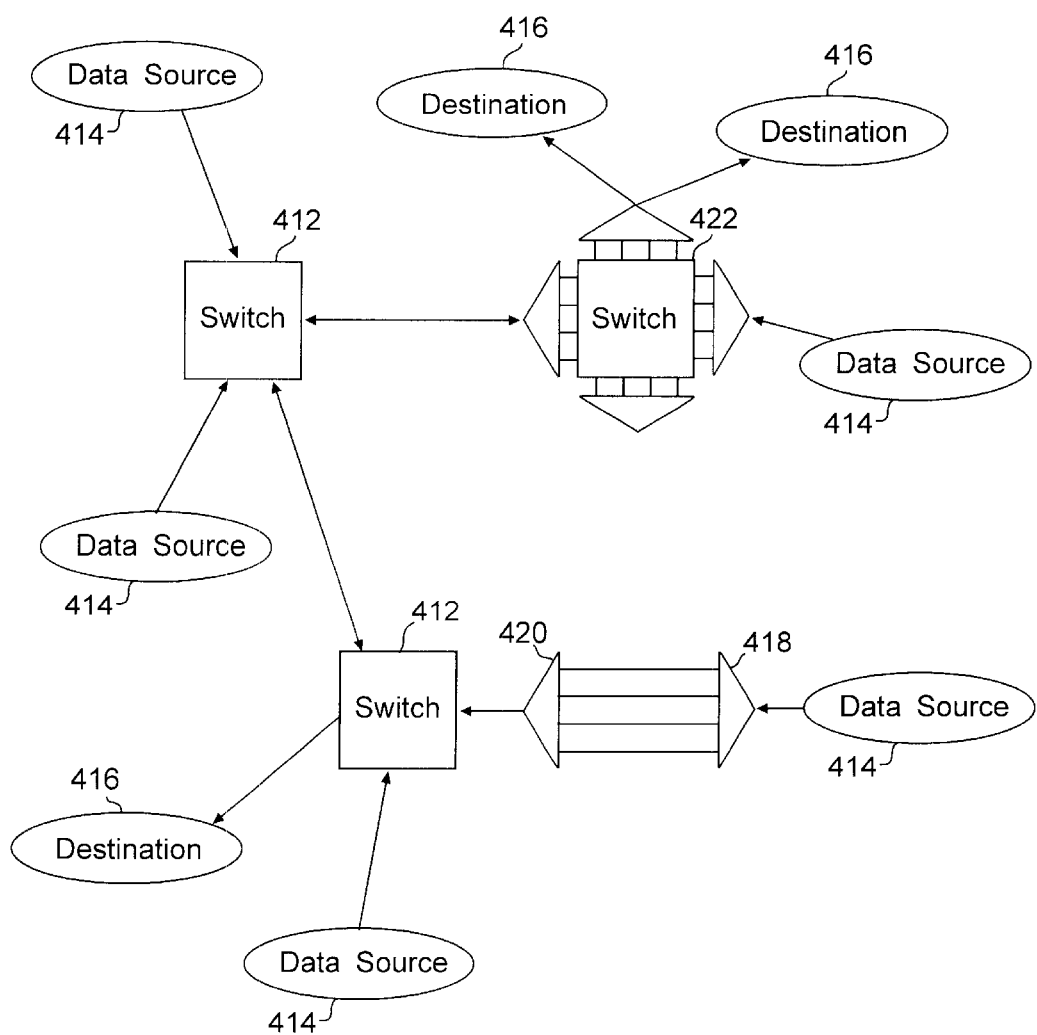
FIG. 1 is a block diagram of a packet switched communication network.

While the present invention is susceptible to various modifications and alternative forms, a specific embodiment thereof is shown, by way of example and not by means of limitation, in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the claims.

As described in detail hereinafter, a preferred method and apparatus are provided for a core switching network to report packet losses, i.e., packet losses which cannot be prevented, to the output controller of the network. Preferably, the output controller uses the reported information to restore packet order despite the fact that some of the packets may have been lost. This first aspect to the invention is referred to herein as the Loss Record Protocol and Apparatus. Additionally, a preferred method and apparatus are provided for checkpointing multiplexed NC traffic of a core switching network for recovering synchronization of the data. This second aspect of the invention is referred to herein as the Advanced Frame Recovery Mode.

FIG. 1 shows a packet network 400 in which a plurality of switches 412, 422 are connected to each other by communication links. A number of data sources 414 are connected to the communication switches. A network connection is established from each of the data sources to a corresponding destination 416 and data packets are transmitted from each data source 414 to the corresponding destination 416. A communication link could be a logical link obtained through aggregation of multiple lower bandwidth links using the point-to-point inverse multiplexing controllers 418 and 420. A communications switch may be an inverse multiplexing switch containing a core packet switch and a plurality of input and output switch connection inverse multiplexing controllers.

Figure 2:
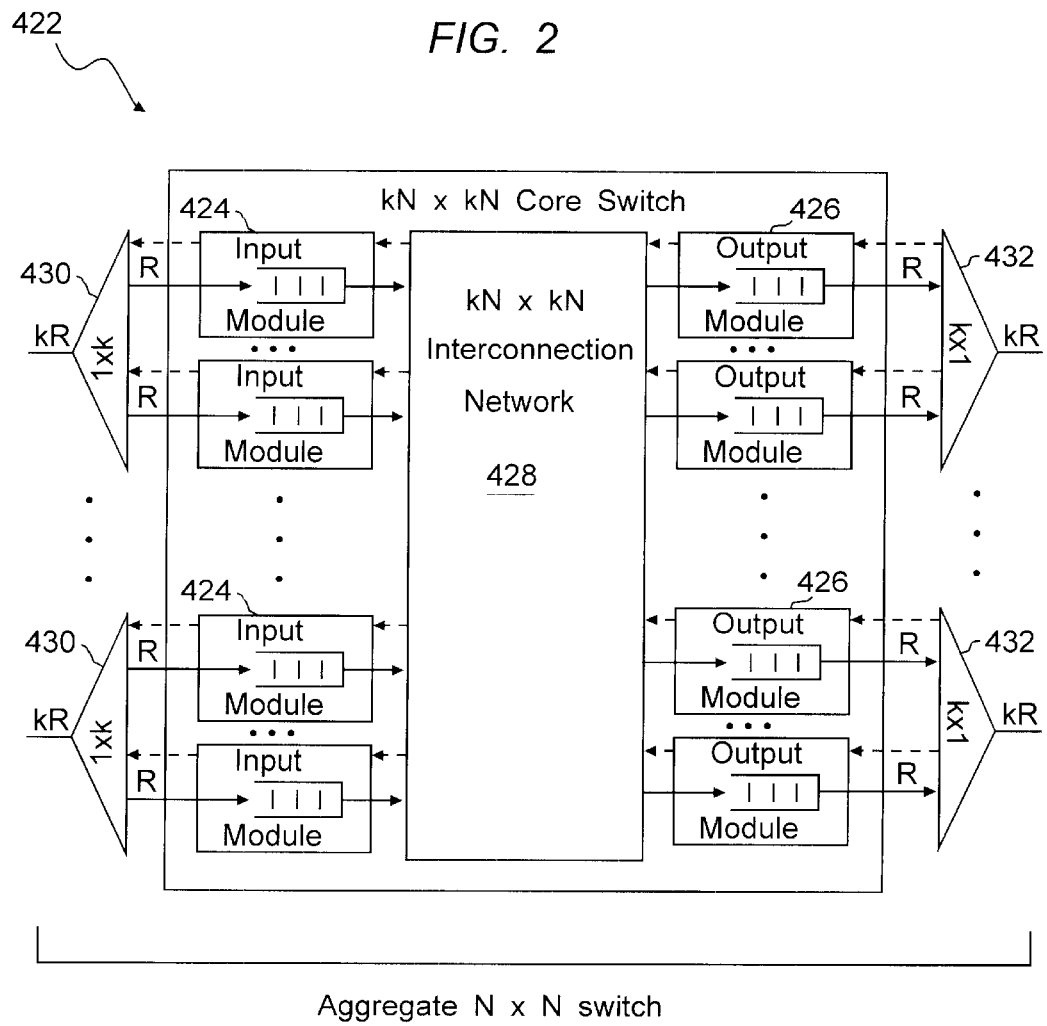
FIG. 2 is a block diagram of a communication switch that supports switched connection inverse multiplexing.

FIG. 2 is a block diagram of the inverse multiplexing communication switch 422 of FIG. 1. The inverse multiplexing switch incorporates input modules 424 and output modules 426 coupled by the interconnection network 428 of the core packet switch 412. In order to provide the switched connection inverse multiplexing functionality, each group of k core switch ports (input and output) with line rate R is connected to a single input controller 430 or output controller 432 to form an aggregate switch with line rate Kr. The buffers in switch 422 are shared to optimize the different source, destination, and priority packet flows within the switch 422. Another mechanism for attaining control over buffering and packet loss within the aggregate switch 422 is through the use of back pressure, which can be applied at five different locations: from the output controllers 432 to the output modules 426; from the output modules 426 to the output of the interconnection network 428; from the outputs to the inputs of the interconnection network 428; from the interconnection network 428 to the input modules 424, and; from the input modules 424 to the input controllers 430. Back pressure is used to affect the traffic of packet flows that are experiencing congestion downstream. The output modules 426 of the core switch 412 also may pass control information to the output controllers 432.

Figure 3:
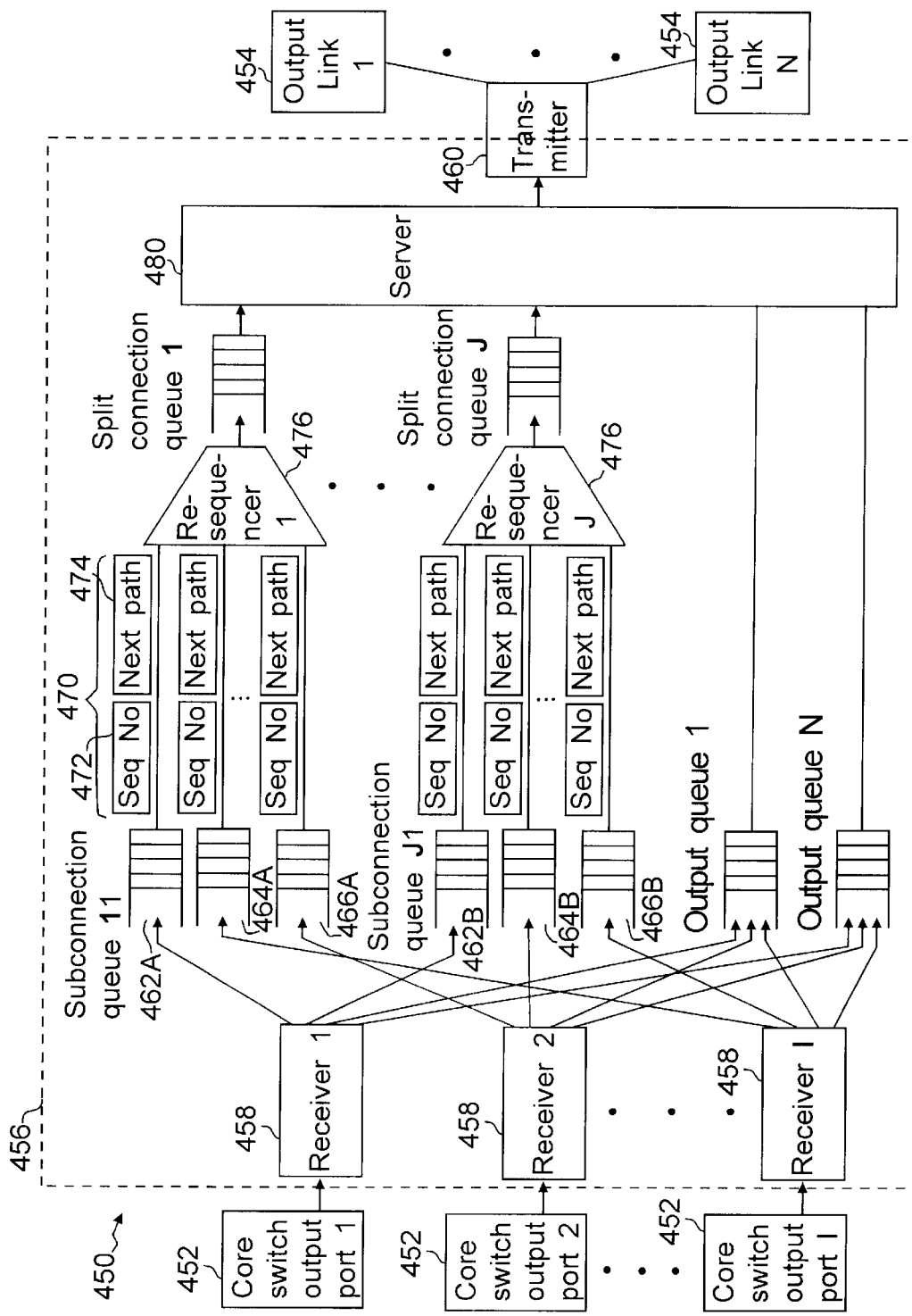
FIG. 3 is a block-diagram of the queue and buffer structure of an output controller, according to the original switched connection inverse multiplexing scheme.

Referring now to FIG. 3, a prior art inverse multiplexing scheme 450 called switched connection inverse multiplexing will now be described. As shown in FIG. 3, the prior art scheme 450 generally includes a plurality of input controllers 452 and a plurality of output controllers 454 attached to a core switching network 456. Preferably, each input controller 452 and each output controller 454 terminates a communication link that can carry a plurality of network connections (NC) with each NC being received at a unique input controller and being routed through the core switching network 456 to a unique output controller 454. The core switching network provides a plurality of switching paths which are provided between receivers 458 and transmitter 460.

The system 450 processes NC requests for switched connections between the incoming communications links 452 and the outgoing communication links 454. Non-multiplexed NCs preferably are established through the core switching network 456 in which the entire bandwidth of the NC is carried by a single switching path. However, inverse multiplexed NCs preferably are established through the core switching network in which the bandwidth of the NC is partitioned among a plurality of switching paths or sub-connections, such as sub-connections 462(a) and (b), 464(a) and (b) and 466(a) and (b).

Every packet of an inverse multiplexed NC is assigned an inverse multiplexing tag 470 which contains a sequence number 472 which reflects the number of packets belonging to every given inverse multiplexed NC transmitted over the same switching path, and a next path pointer 474 which includes the identification of the switching path on which the following packet of the same inverse multiplexed NC will be transmitted. The packets delivered by the various sub-connections are then received at one or more re-sequencers for 476, which, in cooperation with server 480 re-sequences the packets and transmit the data via transmitter 460 to the various outputs 454.

As described briefly hereinbefore, the prior art scheme 450 is not able to exclude all types of packet losses, such as losses associated with electrical glitches, packet memory faults, or interface errors, for instance. Thus, the prior art scheme may lose synchronization during packet re-sequencing and therefore be unable to restore the original order of the inverse multiplexed NC packets.

Description of the Loss Record Protocol and Apparatus

In modern packet switches, the packets stored in memory are organized in a set of logical queues associated with each established network connection (NC). These queues are served in the order which is determined by sophisticated scheduling procedures targeted at guaranteeing that the Quality of Service requirements of the established NCs, which conform to the network service agreement, are met. The allocation of bandwidth and buffer resources to NCs and groups of NCs is dynamically controlled to ensure fair access to the available resources along with protection of the individual NCs, and groups of NCs, against misbehaving peers, for instance. Enforcement of the buffer resource allocation, or buffer management, may require that, in the case when a particular NC or group of NCs consumes excessive buffer space, a packet arriving to the buffer is discarded rather than enqueued. When this happens for a non-multiplexed NC, such packet discard has no further impact, except, perhaps, for a packet retransmission initiated later by the appropriate layer of the network protocol stack. On the other hand, discarding a packet that belongs to a subconnection of some inverse multiplexed NC, and which carries an inverse multiplexing tag required for the NC re-assembly, may cause loss of synchronization at the output controller and inability to reconstruct the NC in the correct packet order.

The present invention provides a method and an apparatus adapted to confront controlled packet losses occurring within the core switch and, in some embodiments, at its last stage.

Preferably, this is accomplished by saving the inverse multiplexing tag of the discarded packet and passing it to the output controller. Preferably, the output controller stores the inverse multiplexing tags of the discarded packets separately from the regular subconnection queue and resorts to those tags when it is required to restore the proper sequence of the switching paths.

Loss Record Generation

In a preferred embodiment, a packet belonging to an inverse multiplexed NC arriving at the output module of the core packet switch (or the last stage of the core switching network) may have to be discarded because of buffer management policy employed by the core switch, as described hereinbefore. In such cases, the output module of the core switch preferably retrieves the inverse multiplexing tag of the packet which has to be discarded, and creates a loss record. Such a loss record, preferably, contains the retrieved tag along with the inverse multiplexed NC identifier and a flag indicating that a loss has occurred. The loss record (LR) is then passed to the output controller via the output port of the core switch. If the packet arriving at the output module of the core switch is enqueued successfully, the LR still needs to be created, in which case, the LR preferably carries the inverse multiplexed NC identifier and a flag indicating a success of the enqueue operation. Since, typically, only two outcomes are possible, e.g., success or loss, a single flag may be utilized. This flag is referred to as the Success Indication Bit (SIB).

Preferably, the SIB utilizes two values, a first value to indicate the success of the packet enqueue operation, and a second value to indicate the failure of the packet enqueue operation. The interface between the output module of the core switch and the output controller should be configured to provide enough control bandwidth to carry an LR per each attempted packet enqueue operation at the output module. The LRs, therefore, typically are not queued at the core switch but, preferably, are immediately delivered to the output controller where they may be buffered until the re-assembly engine running for the specific inverse multiplexed NC requires them. Preferably, the LRs are attached to the currently outgoing packet from the output module, or an idle packet if no outgoing packet exists.

Along with generating an LR and passing it to the output controller, the core switch preferably provides an indication of the losses within the NC packet queue proper. This can be done by means of a loss indication bit (LIB) which, in some embodiments, may be stored with the first packet which is successfully enqueued after a series of packet discards, or with the last packet successfully enqueued before the series of losses begins. From the point of view of the output controller re-assembly procedure, described hereinafter, it is advantageous to store the LIB with the last successfully enqueued packet. Typically, this can be achieved only if the NC packet queue is not empty when a discard occurs. Therefore, in preferred embodiments, every subconnection of an inverse multiplexed connection is allocated buffer space sufficient to hold at least one packet.

Figure 4:
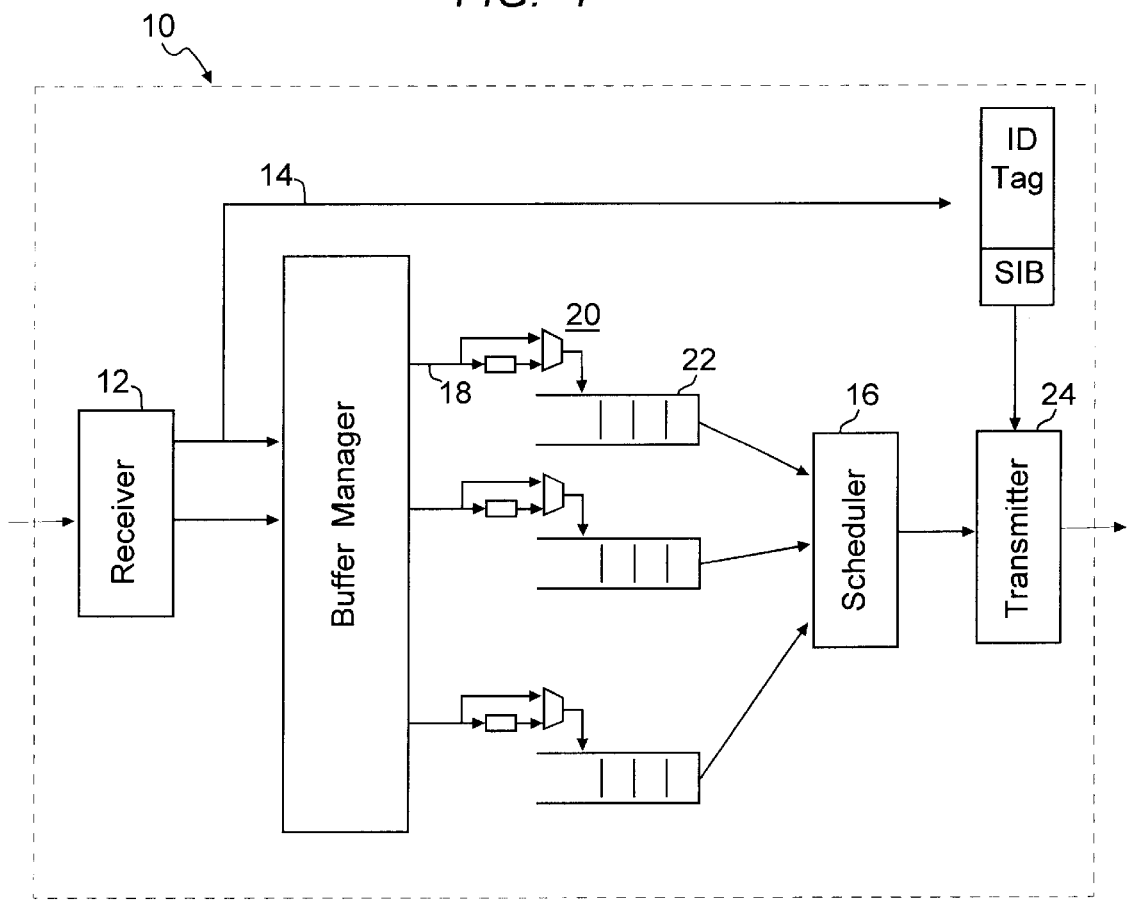
FIG. 4 is a block diagram of a preferred apparatus for implementing loss record generation functionality at the output module of the core switch.

As shown in FIG. 4, a preferred embodiment of an apparatus for implementing loss record generation 10 of the present invention incorporates a receiver 12 which cooperates with a buffer manager 14. Buffer manager 14 preferably cooperates with a scheduler 16 such that data, in the form of packets 18, is transferred from the buffer manager, through a selector 20 which enqueues the packets into a queue 22 for delivery to the, scheduler 16. Scheduler 16 then, in turn, delivers the data to transmitter 24. Preferably, a loss record register 26 also is created and delivered to the transmitter 24.

Figure 5:
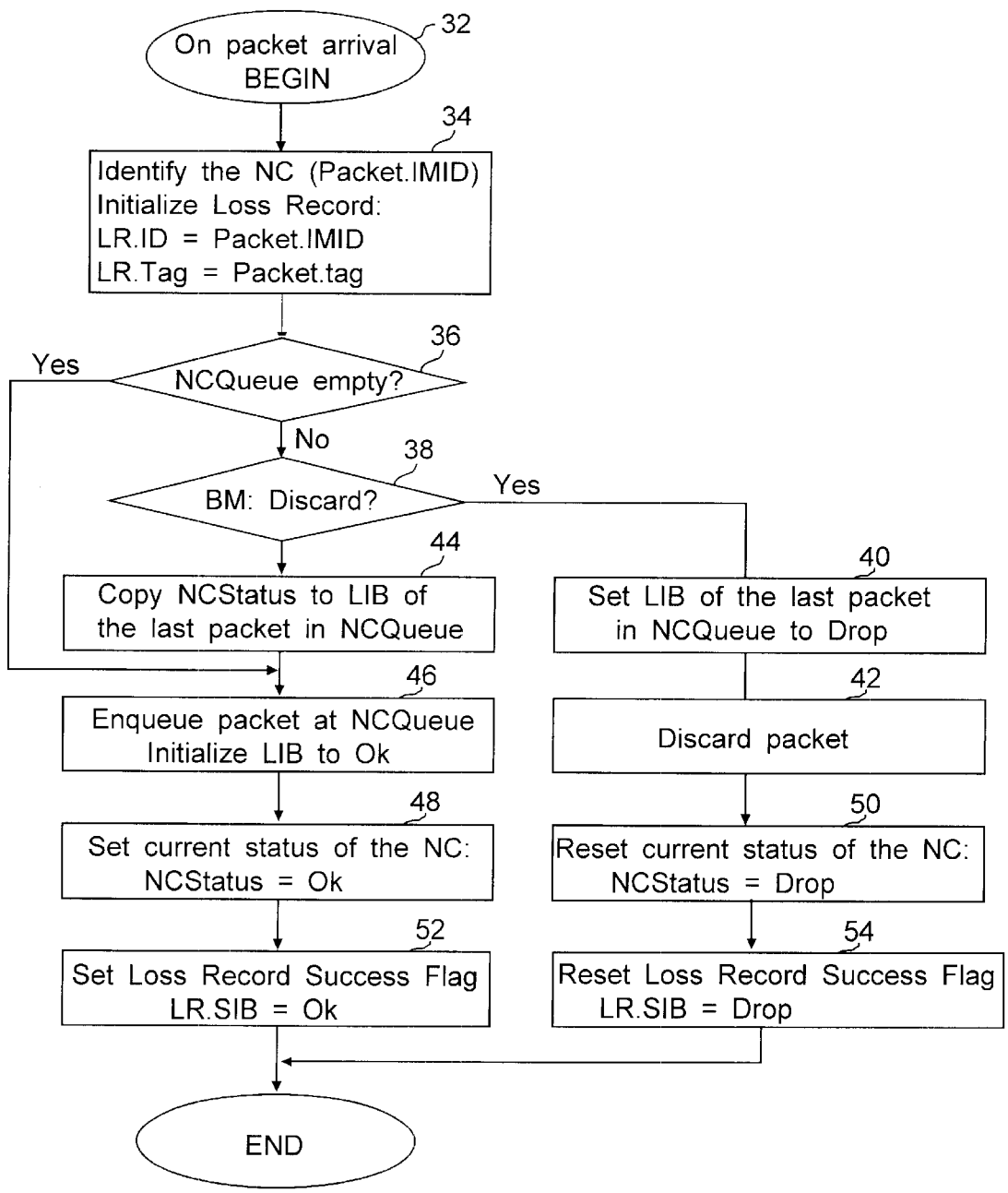
FIG. 5 is a flow chart that illustrates a preferred embodiment of loss record generation at the output module of the core switch.

A flowchart depicting a preferred embodiment of the LR generation procedure is shown in FIG. 5. In FIG. 5, acronym LR denotes the loss record, and LR.ID, LR.Tag, and LR.SIB correspond to different fields of the loss record, i.e., inverse multiplexed identifier, inverse multiplexing tag, and the success indication bit, respectively. Packet.IMID is the identifier of the inverse multiplexed NC to which the given packet belongs. Packet.Tag is the inverse multiplexing tag assigned to the packet. NCQueue is the packet queue of the selected network connection. NCStatus is the current status of the connection that may take one of the two values: Ok, if the packets have been enqueued, or Drop, if one or more packets have been discarded. LIB is the loss indication bit associated with every packet in the NC packet queue. The loss indication bit associated with each packet transmitted across the core switch output interface indicates whether the next packet of the same subconnection has been discarded in the core switch. The success indication bit contained in the loss record indicates that a series of packet discards associated with the subconnection of the inverse multiplexed NC identified with LR.ID has ended.

As shown in FIG. 5, each packet arrives at the receiver (Block 32) which associates it with a specific NC. If the packet belongs to an inverse multiplexed ID, a copy of the inverse multiplexing tag along with the inverse multiplexed NC identifier is written to the loss record register (Block 34). Preferably, the buffer manager uses the NC id information to obtain the status of the NC packet queue (Block 34), and makes a determination as to whether the packet should be enqueued (Block 36) or discarded (Block 38). Depending on the buffer manager determination, the selector, which writes the loss indication bit of the most recent successfully enqueued packet, selects either Drop value (Blocks 40 and 42) or one currently stored in the NC queue status register (Blocks 44 and 46). The buffer manager determination is also latched in the NC queue status register (Blocks 48 and 50) and is written into the SIB field of the loss record register (Blocks 52 and 54). Preferably, operating in parallel, the scheduler selects a queue for transmission, dequeues a packet from the selected queue, preferably the loss indication bit carried with the packet, and passes it to the transmitter. The Transmitter then attaches to the packet the current contents of the loss record register record and sends it to the output port.

When it is necessary for the correct operation of the output controller re-assembly engine, an appropriately encoded idle packet may be transmitted to the output controller. Since the loss record transmitted with the packet across the output interface of the core switch output module is, generally speaking, unrelated to the packet it is attached to, it is advantageous to protect its content using an error correcting encoding.

Loss Log Construction and Connection Re-Assembly

Loss records, which are passed to the output controller using the control bandwidth of the interface between the output module of the core switch and the output controller, are used by the output controller to build a data structure, referred to as a loss log, which contains the inverse multiplexing tags of the packets discarded at the core switch. Unlike the original egress re-assembly engine of the switched connection inverse multiplexing scheme, such as depicted in FIG. 3, the present invention preferably maintains two FIFO queues per each subconnection: one FIFO queue contains the successfully delivered packets with the corresponding inverse multiplexing tags attached, whereas the other FIFO queue contains the loss log.

Figure 6:
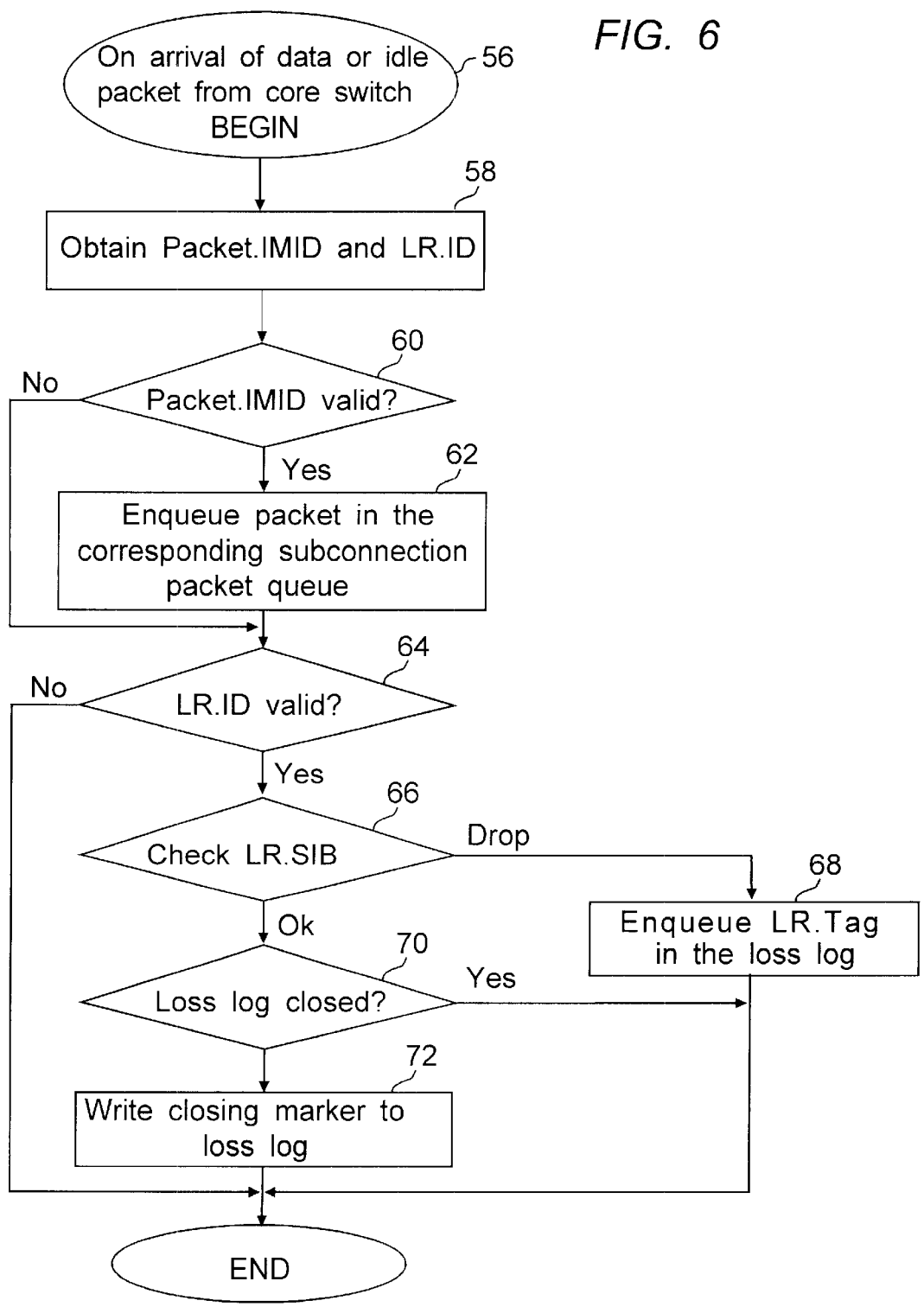
FIG. 6 is a flow chart that depicts receiver operation at an output controller that supports a preferred embodiment of the loss record protocol of the present invention.

Referring now to FIG. 6, when a loss record is received at the output controller (Block 56), it uses the identity of the core switch port along with the inverse multiplexed NC id contained in the loss record (Block 58) to identify the subconnection to which the loss record belongs such as depicted in Blocks 60–64. It then strips the LR.ID field and examines the success indication bit (Block 66). If the success indication bit is set to Drop, the inverse multiplexing tag contained in the loss record is stored in the loss log FIFO queue associated with the given subconnection, as depicted in Block 68, and the loss log is said to become open. If the success indication bit is set to set to Ok, then the status of the corresponding loss log queue is examined (Block 70). If the loss log is found open, then a marker is placed in the loss log (Block 72) and the loss log becomes closed, otherwise, no further action is required and the loss record is discarded. The marker can be implemented, for example, by setting a flag associated with the most recently enqueued entry of the loss log, or by storing the SIB bit along with the inverse multiplexed tag in the loss log, or by utilizing an unused codepoint of the inverse multiplexing tag to create a marker tag and store it in the loss log.

Figure 7:
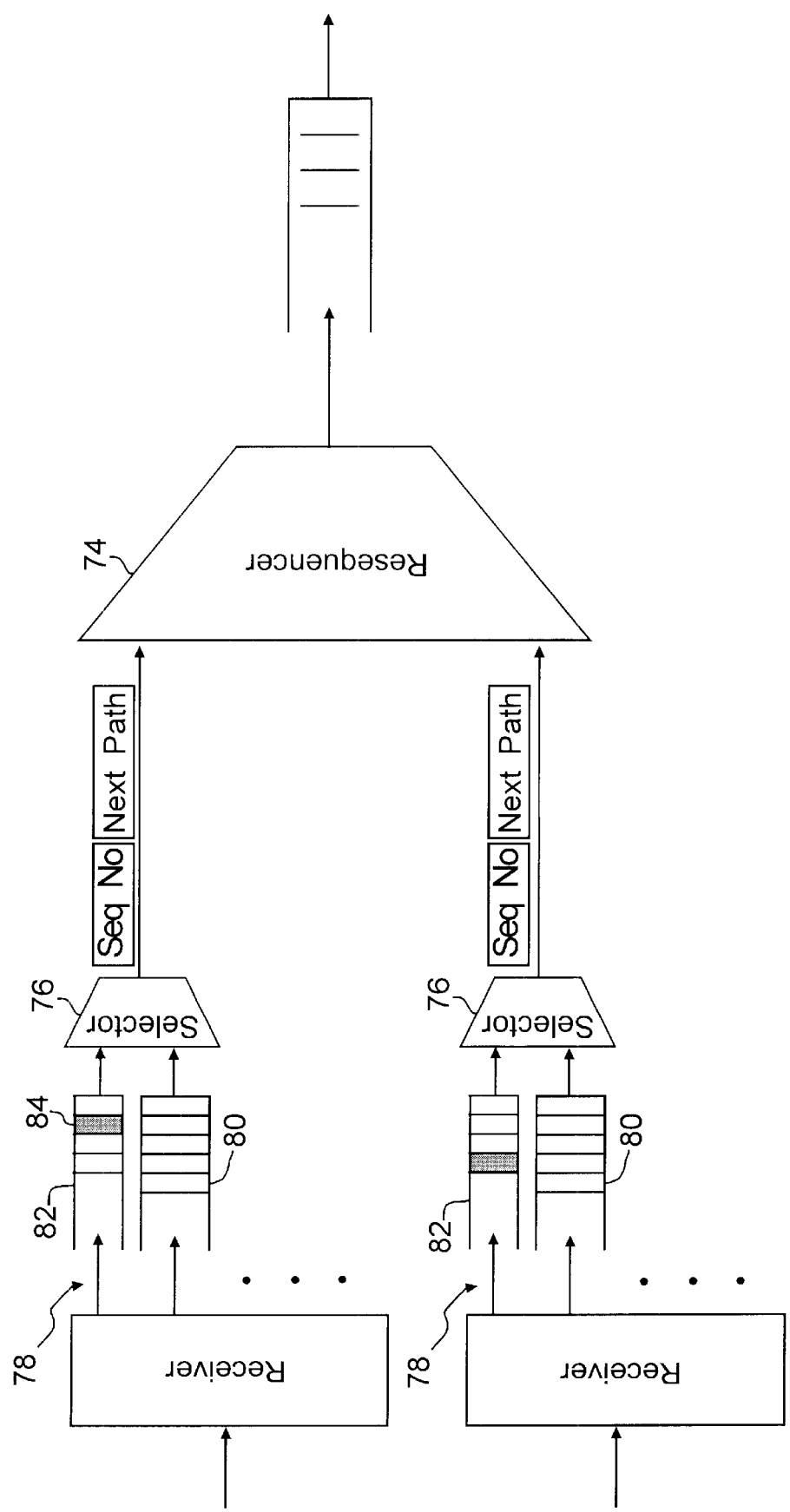
FIG. 7 is a detailed block diagram of the queue structure as suggested by a preferred embodiment of the present invention.

As depicted in FIG. 7, a preferred embodiment of the present invention incorporates a resequencer 74, cooperating with each inverse multiplexed NC, that preferably maintains a selector 76 for each subconnection 78. At each point of time, the selector 76 chooses either the subconnection packet queue 80 or the subconnection loss log 82. When the subconnection gets its turn to dequeue and deliver a packet, the selector preferably is referred to first. If the selector points to the subconnection packet queue 80, the re-assembly proceeds in a conventional fashion, i.e., the inverse multiplexing tag associated with a packet at the head of the packet queue is obtained and examined for the sequence number. If the sequence number in the tag matches the expected sequence number, a packet is dequeued and delivered to the corresponding inverse multiplexed connection re-assembled queue, and the next pointer of the tag is used to dequeue a packet to the next subconnection in the re-assembly chain. If the discrepancy between the sequence number in the tag and the expected sequence number is less than or equal to the number of previous next pointers contained in the inverse multiplexed tag, then the packet remains in the packet queue, and the appropriate field in the tag is used to choose the next subconnection to dequeue. On the other hand, if the selector points to the loss log 82, the re-sequencer proceeds in similar fashion, except no packet is dequeued and delivered to the inverse multiplexed NC queue, nevertheless, the LR field in the loss log FIFO is used to ascertain the next subconnection to dequeue.

Figure 8:
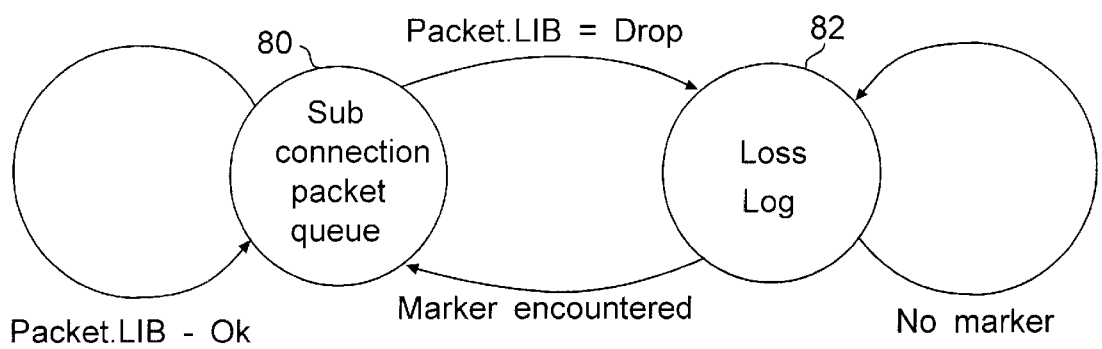
FIG. 8 is a state transition diagram of the selector of FIG. 7.

As depicted in FIG. 8 (a state transition diagram), each selector 76 preferably is controlled by an LIB bit contained in each packet, on one hand, and by markers, such as marker 84, stored in the loss log, on the other. If a packet is dequeued from the subconnection packet queue 80, and the LIB bit of the packet is set to Drop, indicating the beginning of a series of packet discards that have occurred at the core switch as described hereinbefore, the selector preferably is moved to the loss log. If, while reading from the loss log, a marker is encountered, the selector preferably is switched back to the subconnection packet queue 80. Thus, the loss log protocol runs on top of the switched connection inverse multiplexing packet re-assembly protocol. (Note that in the FIG. 7, the loss log associated with the first shown subconnection is open, and the loss log associated with the second shown subconnection is closed.)

Description of the Advanced Frame Recovery Mode (AFRM)

Whereas the re-assembly engine of the prior art switched connection inverse multiplexing scheme (hereinafter referred to as SCIMA) provides protection and is able to recover the packet re-assembly chain after a limited number of inevitable losses which are not reported by the core switch, it also has to be able to recover gracefully when the number of (inevitable or non-preventable) lost packets exceeds the tolerable limit. In this case, some additional number of packets, which have been delivered successfully to the output controller, may have to discarded in order to prevent out of order packet delivery. As soon as synchronization is restored, the re-assembly process should proceed as usual at the newly established starting point, i.e., the subconnection identity, of the NC packet chain.

The AFRM of the present invention brings the concept of asynchronous framing into SCIMA. It is based on the insertion, i.e., regular insertion, of sequentially numbered checkpoints into the packet stream of the split connections. The regularity of insertion does not imply periodicity; the frames may have variable size and follow, for example, the boundaries of the data units of a higher layer protocol, such as AAL5. The size of the frame is independent of the range M of the per-path sequence numbers; in fact, it may be considerably larger than M. However, the frame size affects the number of successfully enqueued packets to be discarded in order to restore the proper sequence. Preferably, checkpoint insertion is achieved without requiring that any type of special OAM packet be transmitted. Instead, the checkpoint information preferably is carried in the local routing header of the data packets. Essentially, checkpointing adds another control field to those used in SCIMA.

Figure 9:
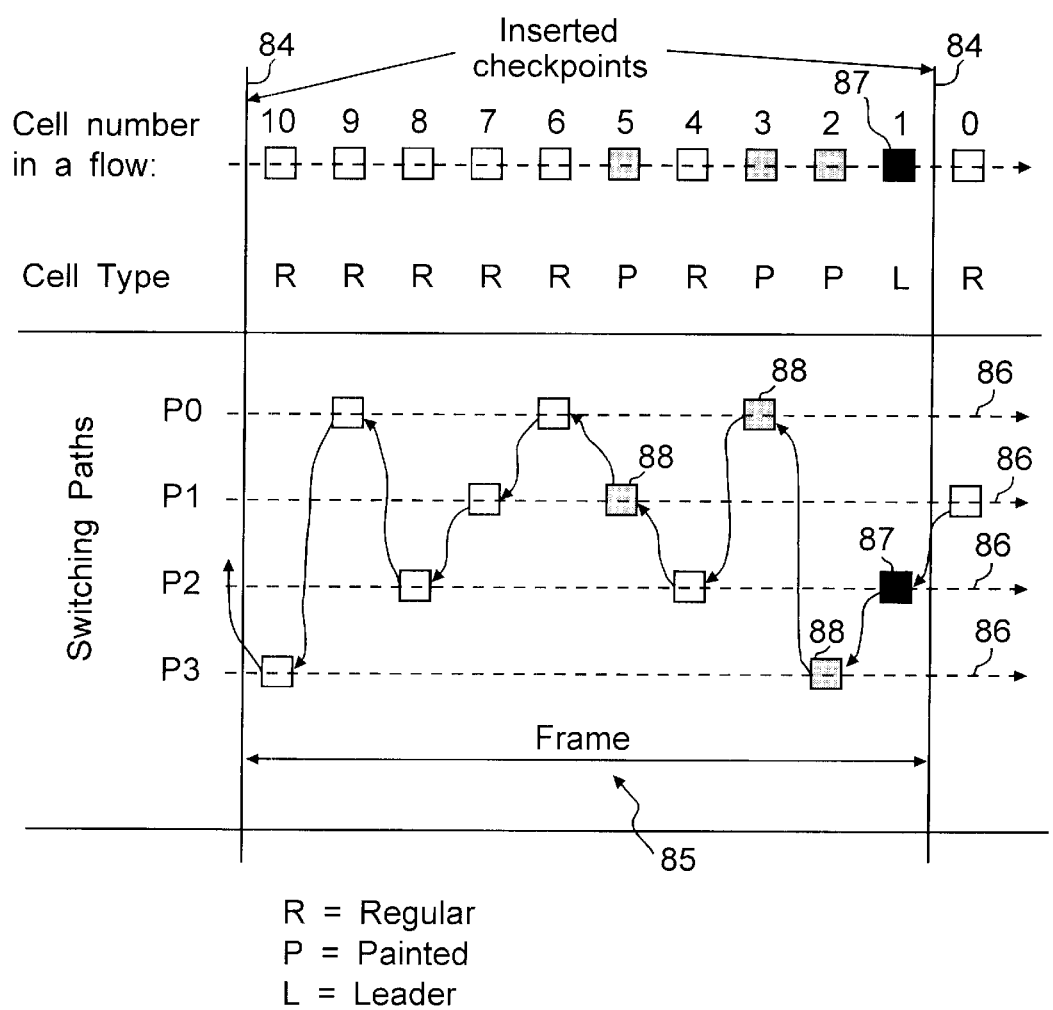
FIG. 9 is a schematic diagram depicting the insertion of checkpoints as suggested by a preferred embodiment of the present invention.

As shown in the embodiment of FIG. 9, checkpoints 84 are utilized to partition each packet stream into frames 85. A portion of a frame that is dispatched via the same switching path is referred to as a subframe 86. The first dispatched packet of a frame, and the corresponding switching path, is referred to as the leader 87 of that frame. Since the packets are dispatched by the input controller in their original order, the chain of packets formed by the NextPath pointers can cross a frame boundary only through a valid leader packet. In addition, since packets are transmitted over each switching path in FIFO order over each switching path, packets belonging to different subframes can not interleave within a subconnection. Therefore, if the re-assembler aligns each subconnection at the beginning of a subframe corresponding to the same checkpoint and correctly chooses the leader, the packet sequence can be reconstructed using the NextPath pointers from there on.

Figure 10:
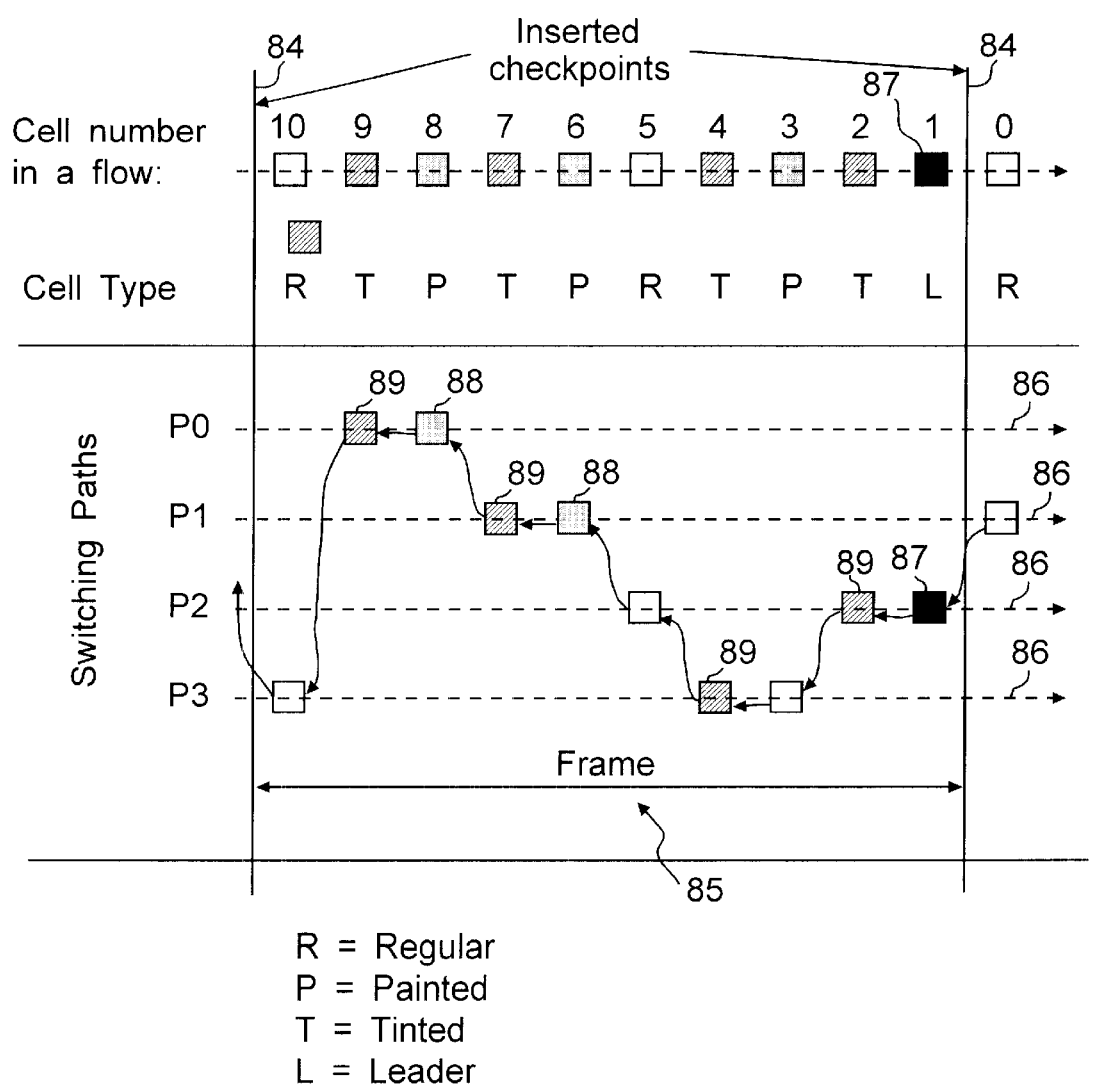
FIG. 10 is a schematic diagram depicting the insertion of checkpoints as suggested by an alternative embodiment of the present invention.

Once the input controller makes a decision to insert a checkpoint into a packet stream, preferably, it marks the first packet which is dispatched to each of the subconnections. These marked packets are referred to as painted packets, i.e., packets 88. In other words, the first packet of each non-empty subframe is "painted," the leader packet being a special case of a painted packet. Hence, in addition to the SCIMA control fields introduced earlier, the AFRM control overhead includes a two-bit field to specify the type of the packet, namely, regular, painted or a leader, and a field that contains the current frame sequence number. Additionally, some embodiments may utilize a tinted type of packet, i.e., packets 89 depicted in FIG. 10, for instance, which will be described in detail hereinafter.

The subframe sizes within the same frame may vary significantly. In particular, the dynamic load-balancing dispatch algorithm used by SCIMA, which operates independently of checkpoint insertion, may transmit most of the frame traffic on one path and/or completely exclude another. If a path exclusion takes place, the first packet transmitted on that path after the exclusion period should be a painted packet or a leader.

The impact of the AFRM on the fault-tolerance properties of SCIMA is, primarily, twofold. First, it provides a means to recover from consecutive packet losses that SCIMA detects but cannot recover from, and a means to handle an indefinite wait situation. In particular, in a preferred embodiment, when a multiple packet loss is detected or a time-out expires while waiting on an empty re-assembly queue, the re-assembly mechanism enters the AFRM mode and flushes each of the subconnection re-assembly queues until a painted packet is encountered.

Flushing preferably is repeated until all queues are aligned on the same frame or are empty, and exactly one leader is found. At this point, the regular re-assembly process may be restarted.

The second impact of AFRM is as an additional fault detection means. In the course of regular re-assembly, the frame sequence numbers carried by all the packets can be checked and compared with the number of the current frame being processed. The inconsistency of the frame sequence numbers may indicate that the SCIMA has failed to detect a loss occurrence in the past, such as when the number of the lost packets is a multiple of M, for instance, and has remained undetected since then; therefore, the order in which the split connection packets have been recently delivered is likely to be incorrect. M is the range of the per subconnection sequence number stipulated by the SCIMA.

Since, in addition to the basic SCIMA information, preferred embodiments of AFRM carry the packet type and the frame sequence number in the packet, the combined size of the sequence control field typically can be determined by:

$$B_{AFRM} = p + (n+1)[\log k] + f + 2$$

where f is the size of the frame sequence number field, p is the size of the SCIMA per subconnection sequence number, n is the number of Prev_NextPath values carried in the inverse multiplexing tag, and k is the number of switching paths. The use of per-path sequence numbers together with frame sequence numbers is not equivalent to the use of a larger sequence total order number. In fact, the range of consecutive packets in the original packet stream over which the frame sequence number completely wraps around, which we denote by W may far exceed $2^{B_{AFRM}}$. The value of W depends on the individual frame sizes, and for each index i of the starting frame, can be found as:

$$W_i = \sum_{j=i+1}^{i+F} S_j \geq F \cdot S_{min}$$

where $F = 2^f$ is the range of the frame sequence numbers and $S_j$ is the size of the j-th frame. To ensure that the numbering scheme works properly, $S_{min}$, the smallest allowable value of the frame size should be selected so that the frame sequence number wrap-around time is larger or equal to twice the maximum estimated differential delay. Specifically, $$S_{min} \geq (2D_{max})/F.$$

Since, in order to minimize the discard of the successfully delivered packets on invocation of AFRM, it is desirable to have the frame size as small as possible. However, a safety factor also may be used in the frame size selection.

As opposed to the total ordering where the size of the sequence control field parameter depends on the worst-case differential delay, in SCIMA with AFRM, different minimum frame sizes may be chosen for different connections depending upon the estimates of their individual differential delays. In addition, given a fixed number of the available sequence control bits, considerable freedom is possible in partitioning them into the per-path sequence number field, the frame sequence number field, and one or more Prev_NextPath pointers, for instance.

The operations in the input controller in order to support frame recovery in preferred embodiments are quite straightforward. The controller preferably maintains a current frame number for every split virtual connection (NC), and updates it regularly, as long as the minimum frame size restriction is met. Every dispatched packet is given the current frame number. After a frame boundary, the first packet is marked as the leader packet for that frame, and the first packets destined to each of the switching paths (some paths may be excluded from the current frame by the dispatch process of SCIMA) are marked as painted packets.

Most of the implementation complexity of AFRM is in the output controller. For the purposes of SCIMA, the controller maintains a set of re-assembly queues, one for each subconnection, which store the packets arriving from the respective switching paths. In addition, for each split NC, it maintains a pointer, ExpectedPath, to the queue from where it expects the next packet, and the expected value of the sequence number, SeqNum, for each of the paths. For the purposes of AFRM, the controller maintains the value of the current frame sequence number, CurrFrame. This may be either the current frame under regular SCIMA re-assembly or the current frame that is being flushed whenever AFRM is invoked. We define the frame number of a queue as the frame sequence number contained in the packet at the head of the queue, or the last seen frame sequence number, if the queue is empty. For the purpose of illustration, hereinafter, we assume that the number of Prev_NextPath pointers to be equal to one.

In the embodiments described in detail hereinafter, each of the SCIMA re-assembly queues can be in one of the following states:

NORMAL—the queue is eligible for regular SCIMA re-assembly;

FLUSH or IN_AFRM—the queue is being subjected to AFRM and packets in the queue are currently being discarded;

WAIT—the queue completed an AFRM iteration and is aligned at the beginning of the next subframe; and IDLE—the queue has been timed out at some point in the past, and the frame numbers seen in this queue have no relevance to the current frame number.

The basic idea is to invoke AFRM on every non-empty queue whenever SCIMA cannot recover from the losses it detects, as well as in the case when a polled queue times out. When AFRM is invoked on a connection, the re-assembler flushes the queues for each of the switching paths, until it sees a change in frame numbers, or the queue becomes empty. If the non-empty queues agree on a frame number and a unique leader is found, the re-assembly resumes. Otherwise, a new iteration of AFRM is invoked and flushing is repeated. This occurs, for example, when a leader packet is lost. Since AFRM flushes the frames one by one, preferably on all queues simultaneously, this mode is referred to as parallel flushing.

Alternatively, flushing may be required in the case of late arrivals. When a queue remains empty for a long time, it moves to the IDLE state, as a result of which the current frame sequence number has no relevance to this queue. Instead, when a packet eventually arrives, the queue preferably is subject to independent flushing in order to catch up with the current frame. Since several subframes are flushed one after the other from the same queue, this mode is referred to as serial flushing.

Figure 11:
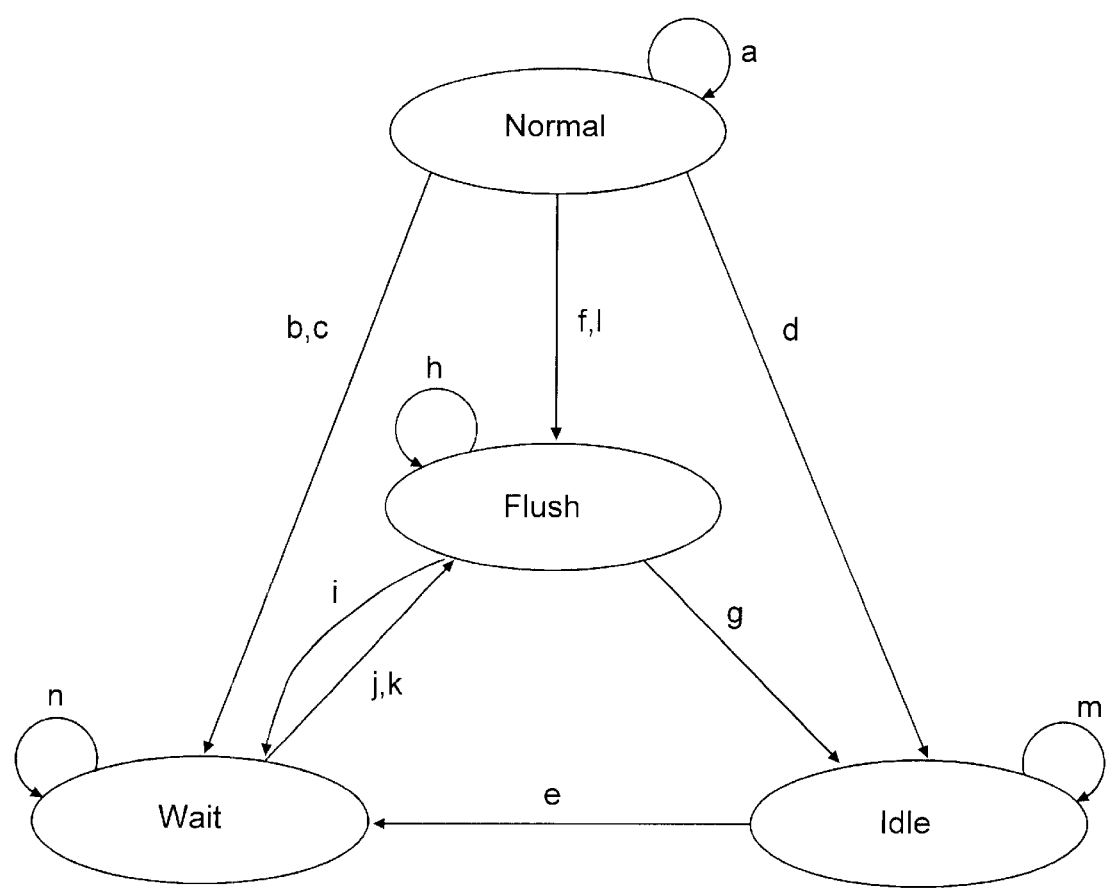
FIG. 11 is a state transition diagram of a preferred embodiment of the Advanced Frame Recovery Mode (AFRM) of the present invention.

Preferably, each queue moves from one state to another as shown in the state transition diagram in FIG. 11, where the following functionality is represented: (a) regular SCIMA dequeue; (b) leader packet found with correct frame number and all other non-idle queues in WAIT; (c) leader or painted packet with correct frame number found and accessed by NextPath; (d) time-out on empty queue when accessed by NextPath; (e) packet at head of the queue with future frame number; (f) time-out by another queue; (g) empty queue; (h) same frame number as current frame; (i) change in frame number with respect to the current frame; (j) negation of condition c; (k) no leader found, and all non-idle queues in WAIT, and frame number matches current frame; (l) packet sequence number off by more than 1; (m) packet at head of the queue with a past frame number, and; (n) negation of condition k.

Figure 12A:
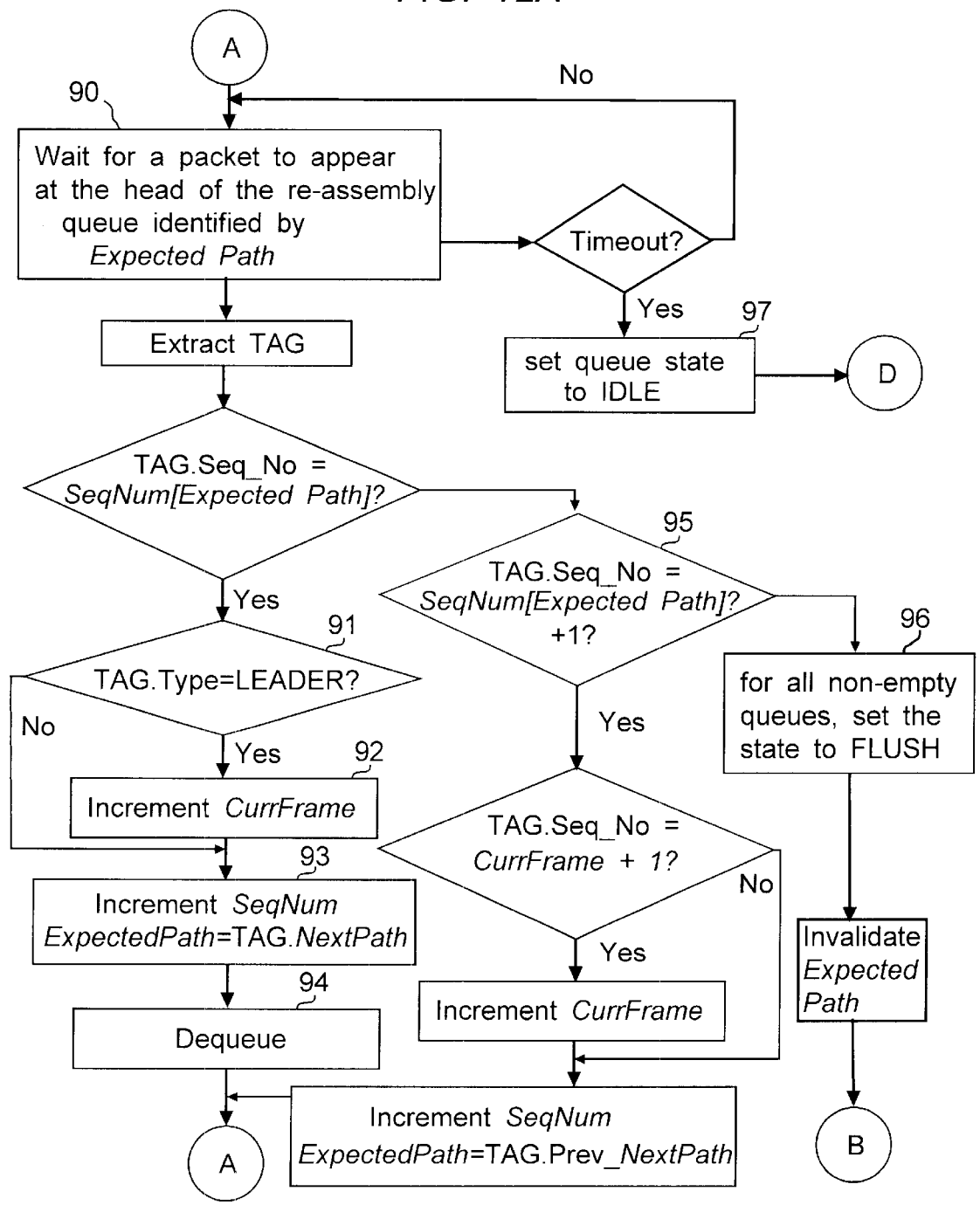
FIGS. 12A–12F are flow charts depicting state processing performed in a preferred embodiment of the present invention.

Referring now to FIGS. 12A–12F, a preferred embodiment of a system incorporating AFRM will be described. As shown in FIG. 12A, processing of a non-empty NORMAL queue, when ExpectedPath points to it is depicted (block 90). If the per-path sequence number in the packet at the head of the queue matches SeqNum for the corresponding path (block 91), SCIMA dictates that the packet be dequeued (block 94), and the values of ExpectedPath and SeqNum be updated. As shown in block 92, the value of CurrFrame is incremented if the packet is a leader with the next frame sequence number (block 93). If the per-path sequence numbers are off by one (block 95 ), the Prev-NextPath value in the packet header is used to continue re-assembly. The packet itself remains at the head of the queue. If, however, the sequence numbers differ by more than one, AFRM preferably is invoked by setting the state of every non-empty queue to FLUSH (block 96). After that happens, the value of CurrFrame refers to the frame number that is currently being flushed. If a NORMAL queue being polled remains empty for a period longer than the time-out, it preferably is set to the IDLE state (block 97), and all the other non-empty queues are set to the FLUSH state, in order to attempt a re-alignment at the next frame boundary.

Figure 12B:
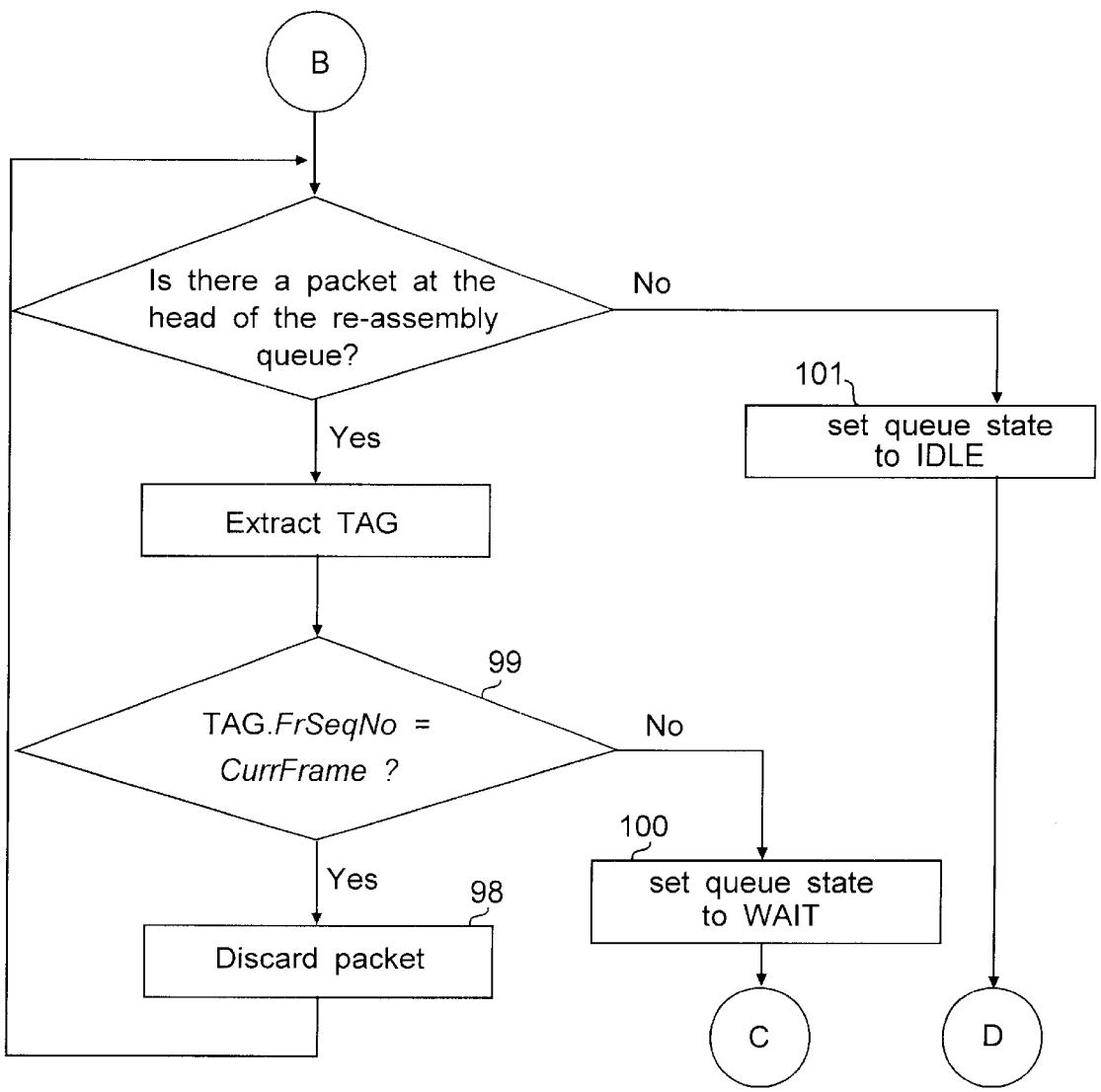

Preferred processing of FLUSH and WAIT states will now be described. As shown in FIG. 12B, if one or more queues are in the FLUSH state, the packets in each of those queues are discarded (block 98), preferably in parallel, until the frame number of the queue differs from the current frame number. This denotes the end of one iteration of AFRM for that queue, and the state is changed to WAIT (blocks 99 and 100). If the queue becomes empty while flushing, its state preferably is immediately changed to IDLE (block 101).

Figure 12C:
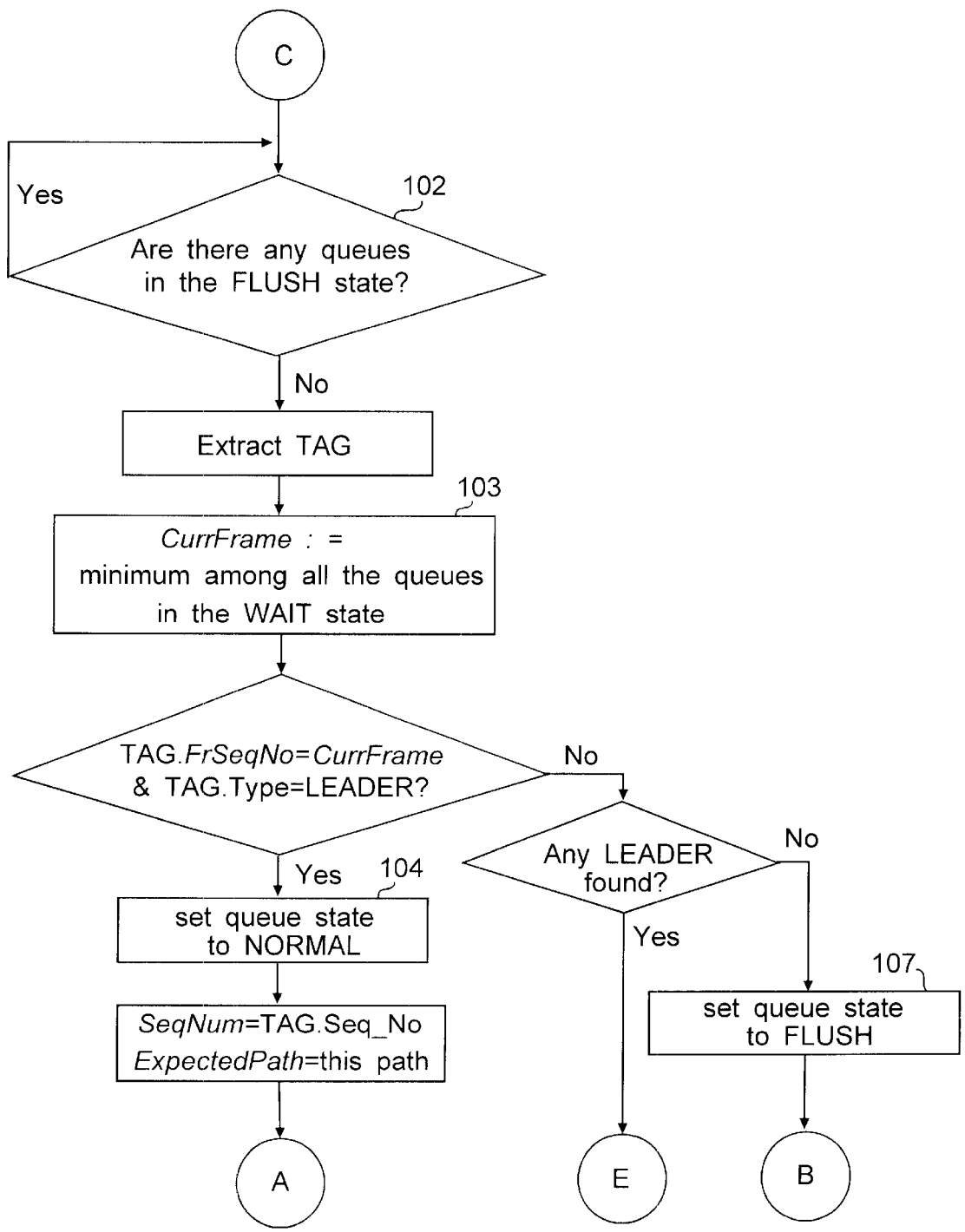

As shown in FIG. 12C, a queue in the WAIT state preferably is processed only when no other queue is in the FLUSH state (block 102), or when it is polled during the regular SCIMA re-assembly. If all the other non-IDLE queues are in the WAIT state, then it means that they are waiting to agree upon a new frame boundary. In that case, the value of CurrFrame is updated to the minimum of the frame numbers of all the WAIT queues (block 103). If a leader of this frame is found in one of the queues, re-assembly begins from that queue and its state is reset to NORMAL (block 104). The remaining queues stay in the WAIT state until they are polled by the NextPath. When this happens, the state transition depends upon the type of the packet at the head of the queue.

Figure 12D:
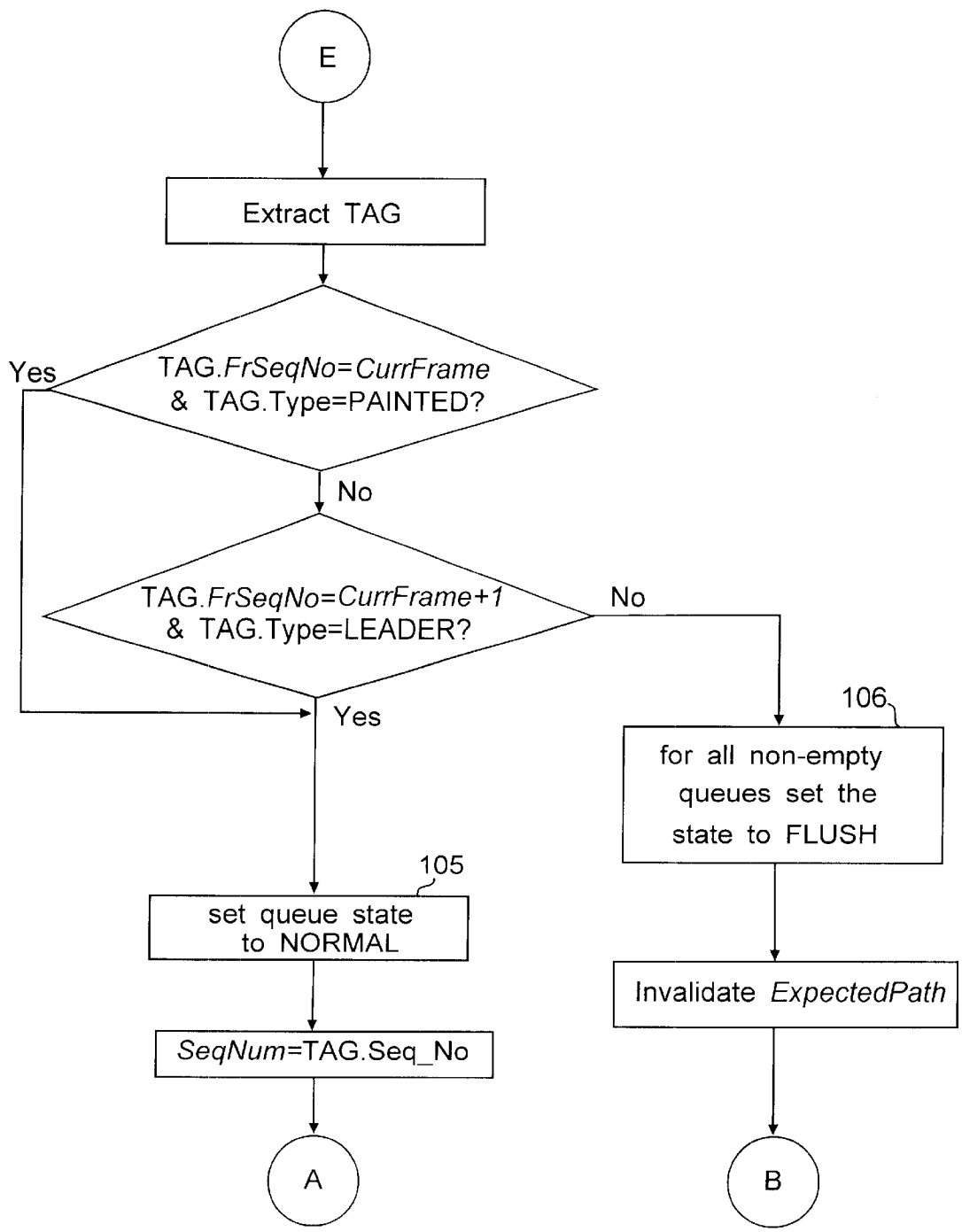

As shown in FIG. 12D, if the packet at the head of the queue is painted with the same frame number as CurrFrame or is a leader with a frame number that is higher by one, the queue is reset to the NORMAL state (block 105). In all other cases, AFRM is invoked again by changing the states of all the non-IDLE queues to FLUSH (block 106). Every transition back to NORMAL also is associated with the re-initialization of the per-path sequence number. If all the non-IDLE queues are in the WAIT state and the leader is not found, another iteration of AFRM is invoked by setting the state of each of the queues whose frame number matches CurrFrame back to FLUSH (block 107 of FIG. 12C).

Figure 12E:
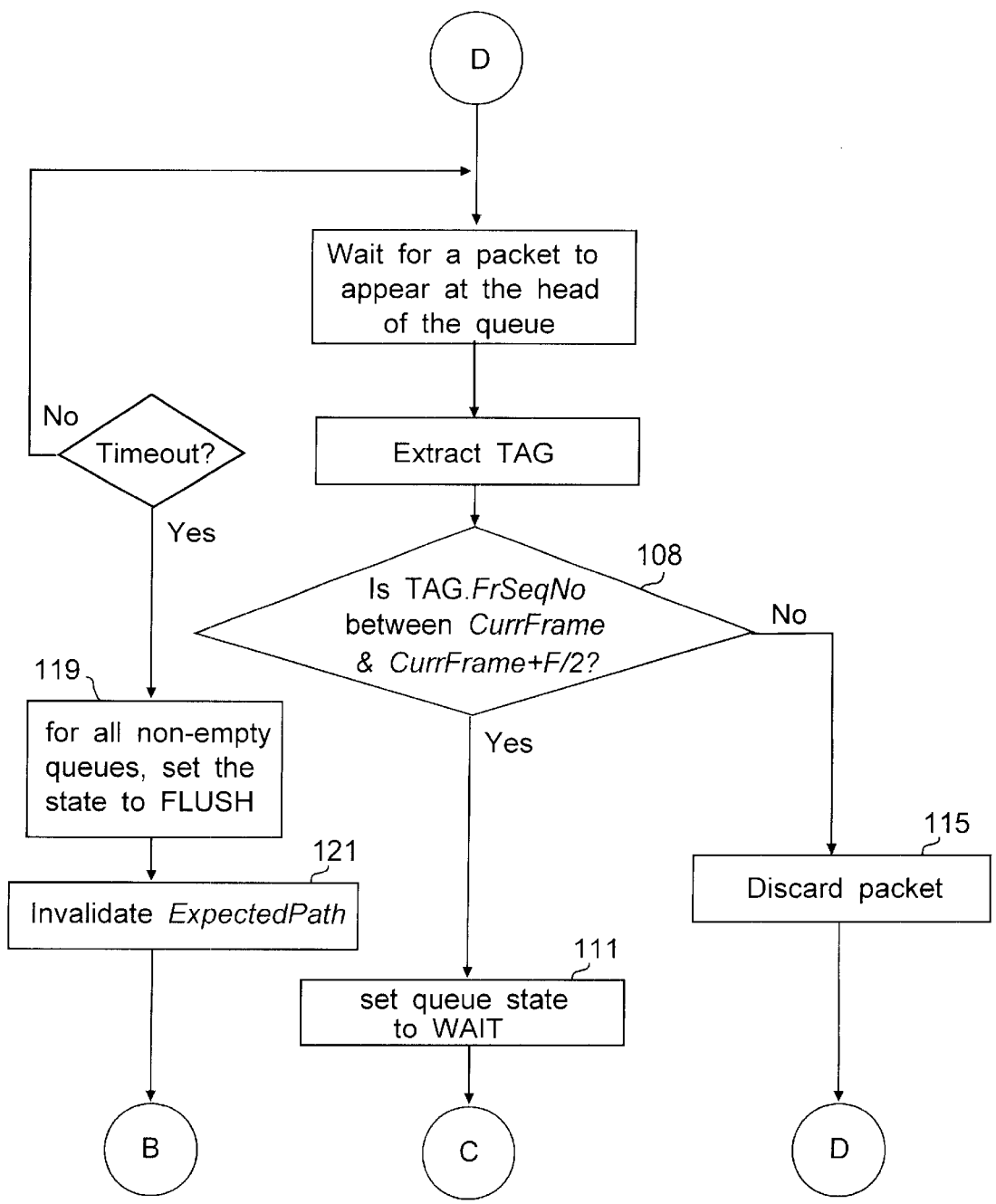
Figure 12F:
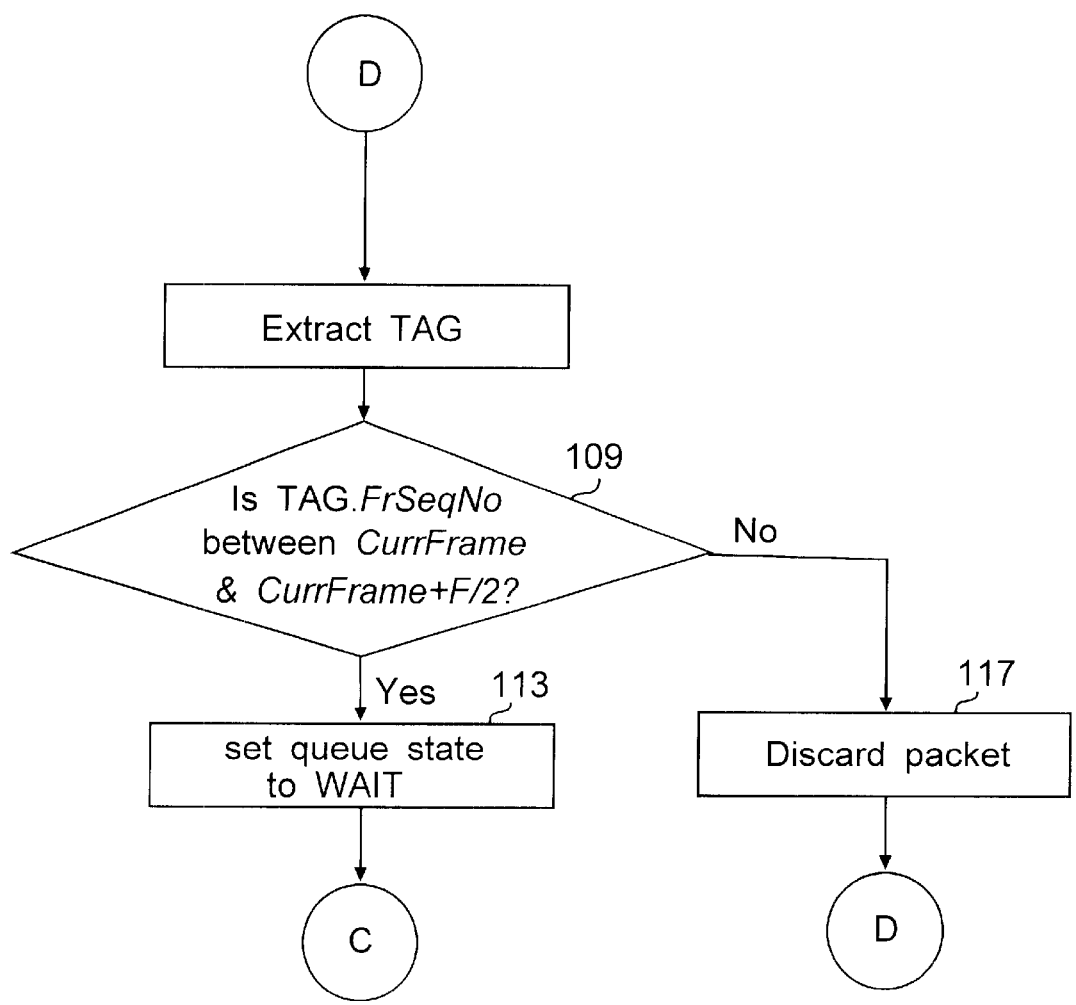

Referring now to FIGS. 12E and 12F, preferred processing of the IDLE state will now be described. As mentioned above, a transition from the NORMAL to the IDLE state is associated with a time-out (FIG. 12E), while the transition from FLUSH to IDLE is not (FIG. 12F). This implies that late arrivals can occur when a queue is in the IDLE state. When a packet arrives at the head of an IDLE queue, its FrSeqNo is compared with CurrFrame (i.e., block 108 of FIG. 12E, block 109 of FIG. 12F), and if it is within F/2 ahead of CurrFrame, then the packet is considered useful for future re-assembly. In that case, the state of the queue is changed to WAIT i.e., block 111 of FIG. 12E, block 113 of FIG. 12F). Any other outcome may be attributed to a late arrival, and preferably is discarded (i.e., block 115 of FIG. 12E, block 117 of FIG. 12F). If, as depicted in FIG. 12E, an IDLE queue is polled by the NextPath pointer, the controller waits for the state of the queue to change to WAIT. If the state does not change to WAIT before a time-out occurs, the rest of the queues preferably are subjected to yet another iteration of AFRM (blocks 119 and 121), in order to find alignment at the boundary of the next frame. Thus, an IDLE queue transitions into either the NORMAL state or the FLUSH state, typically always passing through an intermediate WAIT state.

With reference to the flowcharts of FIG. 13A through FIG. 13F, and FIG. 14A through FIG. 14I, the operation of alternative embodiments of the Advanced Frame Recovery Mode (AFRM) are described hereinafter. The flowcharts in FIG. 13A through FIG. 13F describe the steps preferably taken by the ingress controller in order to checkpoint the sequence of packets belonging to a single inverse multiplexed NC going to a plurality of switching paths. The flowcharts in FIG. 14A through FIG. 14I describe the steps preferably taken by the egress controller in order to implement AFRM, and thereby detect and recover from severe packet losses which cannot be handled by regular controller operation. Preferably, all the operations depicted in the flowcharts are performed for every NC in the ingress and egress controllers in parallel.

Specifically, three different embodiments of the AFRM are described. The first version is the most general form of AFRM embodiments presented and is called the General Format. The other two versions are modifications of the General Format that use a smaller number of fields in the tag that is attached to each packet, and are called Reduced Format, versions 1 and 2. They differ from the General Format in the restrictions placed on the dispatch module, and the extent of losses that can be recovered.

AFRM Ingress Operations

Figure 13A:
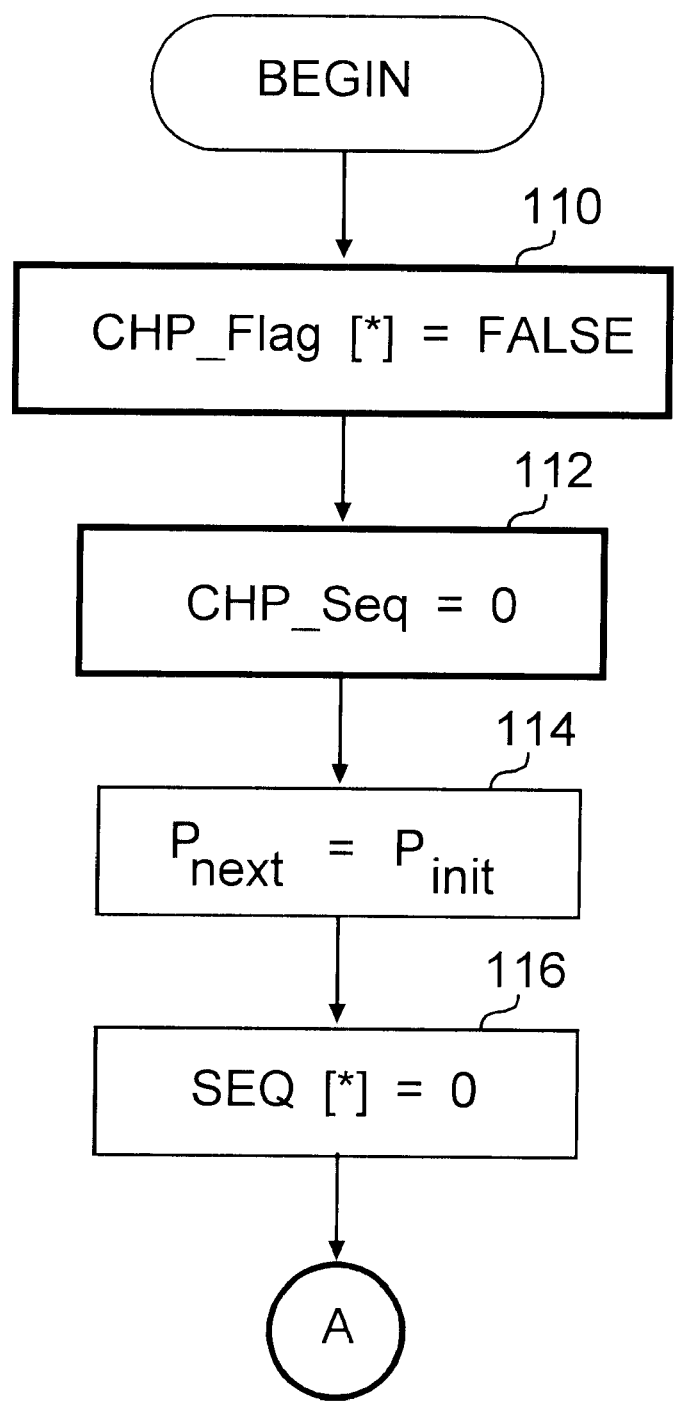
FIGS. 13A–13F are flow charts depicting preferred embodiments of the input controller advanced frame recovery functions and procedures.
Figure 13B:
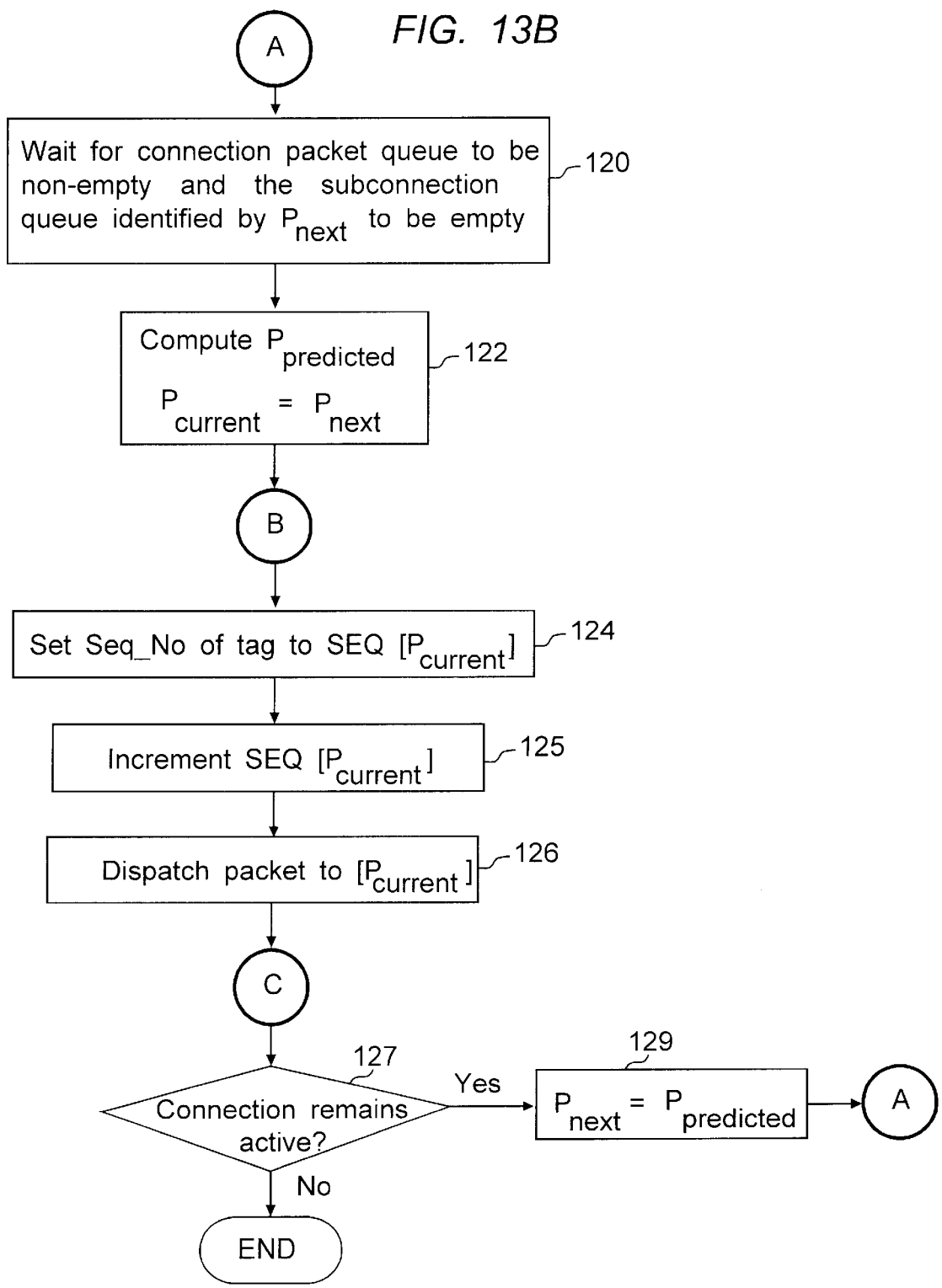

FIG. 13A shows the steps in the initialization of the ingress SCIMA. The process begins with step 110, in which the values in the array of registers CHP_Flag, one for each of the plurality of switching paths, is set to FALSE. These registers indicate whether a checkpoint operation needs to be performed for the respective switching paths. In step 112, the register CHP_Seq, which contains the current frame number, has its value initialized. Following step 112, steps 114 and 116 show the regular SCIMA initializations, wherein the variable $P_{next}$ and the sequence number variable array, again, one for each switching path, are initialized.

Following termination A to step 120 in FIG. 10B, the regular SC operations are described below. The ingress controller waits until the connection packet queue has packets to be dispatched, and the subconnection queue identified by $P_{next}$ to be empty. In step 122, the adaptive dispatch module of SC computes the value of the variable $P_{predicted}$ which will be used to dispatch the subsequent packet of the NC. The variable $P_{current}$ is assigned the value of $P_{next}$. Following this step, the controller preferably proceeds to termination B, which will be described in detail hereinafter, where the checkpoint operations necessary for AFRM are performed. After the completion of the steps following termination B, the sequence number from the register for the switching path corresponding to $P_{current}$ is copied into the Seq_No field of the inverse multiplexing tag (referred to hereinbefore as SeqNum) in step 124, and the sequence number preferably is incremented in step 125 using modulo arithmetic. The packet at the head of the connection packet queue is dispatched to the subconnection queue identified by the variable $P_{current}$ in step 126. In the next step, the controller proceeds to termination C, described hereinafter, wherein the controller determines whether a future checkpoint operation is necessary. If the connection remains active, the variable $P_{next}$ preferably is assigned the value of the variable $P_{predicted}$ in step 129, and the controller loops back to termination A.

As described herein, the steps following termination B depend on the version of AFRM used by the controller. Hence, termination B will be described in reference to three alternative forms B0, B1 and B2. The General Format and the Reduced Format version 1 preferably use two types of tags, REGULAR and PAINTED, while the Reduced Format version 2 also uses a TINTED type.

Figure 13C:
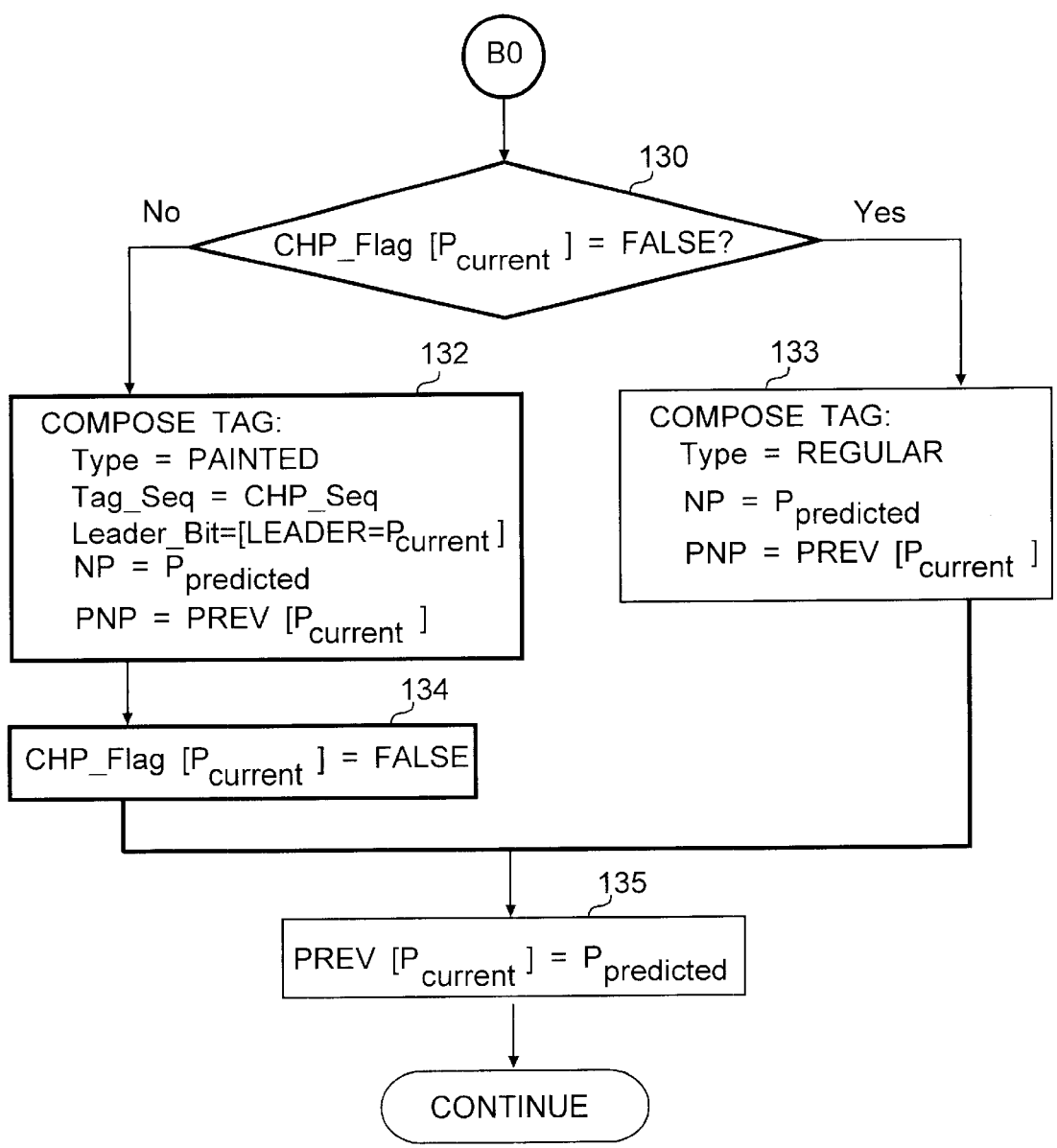

The flowchart in FIG. 13C refers to the General Format of AFRM. In this format, following termination B0, the process checks the value of CHP_Flag corresponding to the switching path referred to by the variable $P_{current}$ in the diamond 130. If the value has been set, the controller proceeds to step 132, otherwise it proceeds to step 133. In step 132, the actual checkpoint marking is carried out, indicating the beginning of a new frame for the switching path. The fields of the packet tag are assigned the following values. The type of the tag is set to PAINTED, the field Tag_Seq (referred to hereinbefore as FrSeqNo) which indicates the frame number is set to the value CHP_Seq. If the variable LEADER matches the value Of $P_{current}$ indicating that this is the first switching path for the new frame, the Leader_Bit field in the tag is set. In step 134, the above value of CHP_flag is reset as the checkpoint operation for this frame and this switching path has been completed. In step 133, the type of the tag is set to REGULAR. In both steps 132 and 133, the NP field (referred to hereinbefore as NextPath) in the tag is assigned the value of $P_{predicted}$ and the PNP field (referred to hereinbefore as Prev_NextPath) is assigned the value in the register PREV (which stores the previous predicted value for each switching path) corresponding to the switching path indicated by $P_{current}$. Following steps 133 and 134, the process goes to step 135, where the value of PREV is updated to $P_{predicted}$. Next, the process continues to the step 124 of FIG. 13B.

Figure 13D:
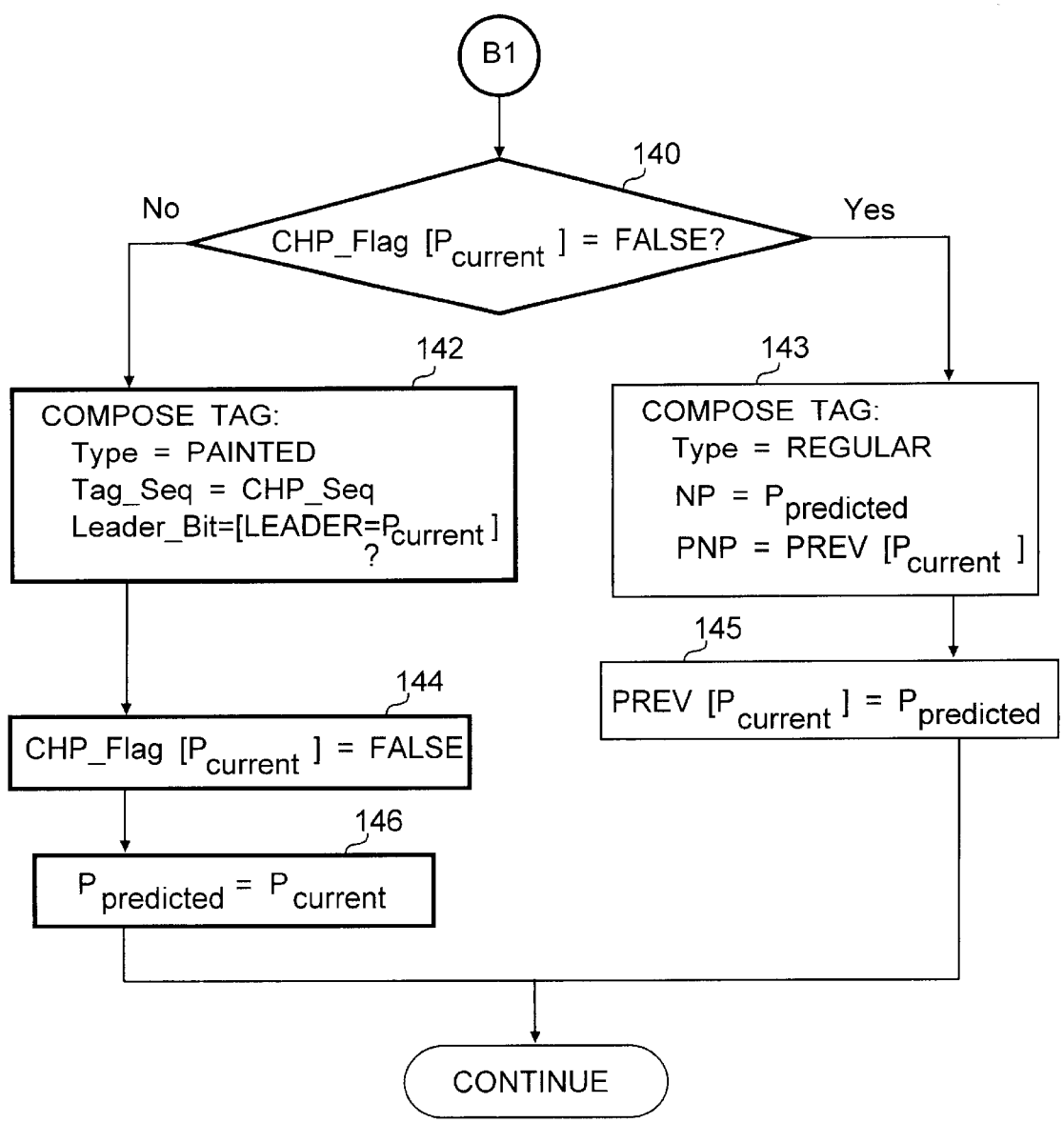

The flowchart in FIG. 13D refers to the Reduced Format version 1, starting with the termination B1. The operation of diamond 140 is similar to the one of diamond 130. Step 142 shows the insertion of the checkpoint in this format. The type of the tag is set to PAINTED. The Tag_Seq and Leader_Bit fields are set in the same manner as described in step 132. Following step 142, the controller proceeds to step 144, which is identical to the step 134, and following step 143, it proceeds to step 145 which is identical to the step 135 in FIG. 13C. As opposed to the General Format, step 142 does not contain the setting of NP and PNP fields, because those fields are shared with, and are indeed the same as, the fields Tag_Seq and Leader_Bit. The meaning attached to the fields change depending upon the type of the tag. Following step 144, the controller proceeds to step 146, where the value $P_{predicted}$ is reset to $P_{current}$. This step nullifies the value predicted by the adaptive dispatch module in case the tag is of type PAINTED, because in this format, the tag cannot carry the field NP. Following steps 145 and 146, the process continues to the step 124 of FIG. 13B.

Figure 13E:
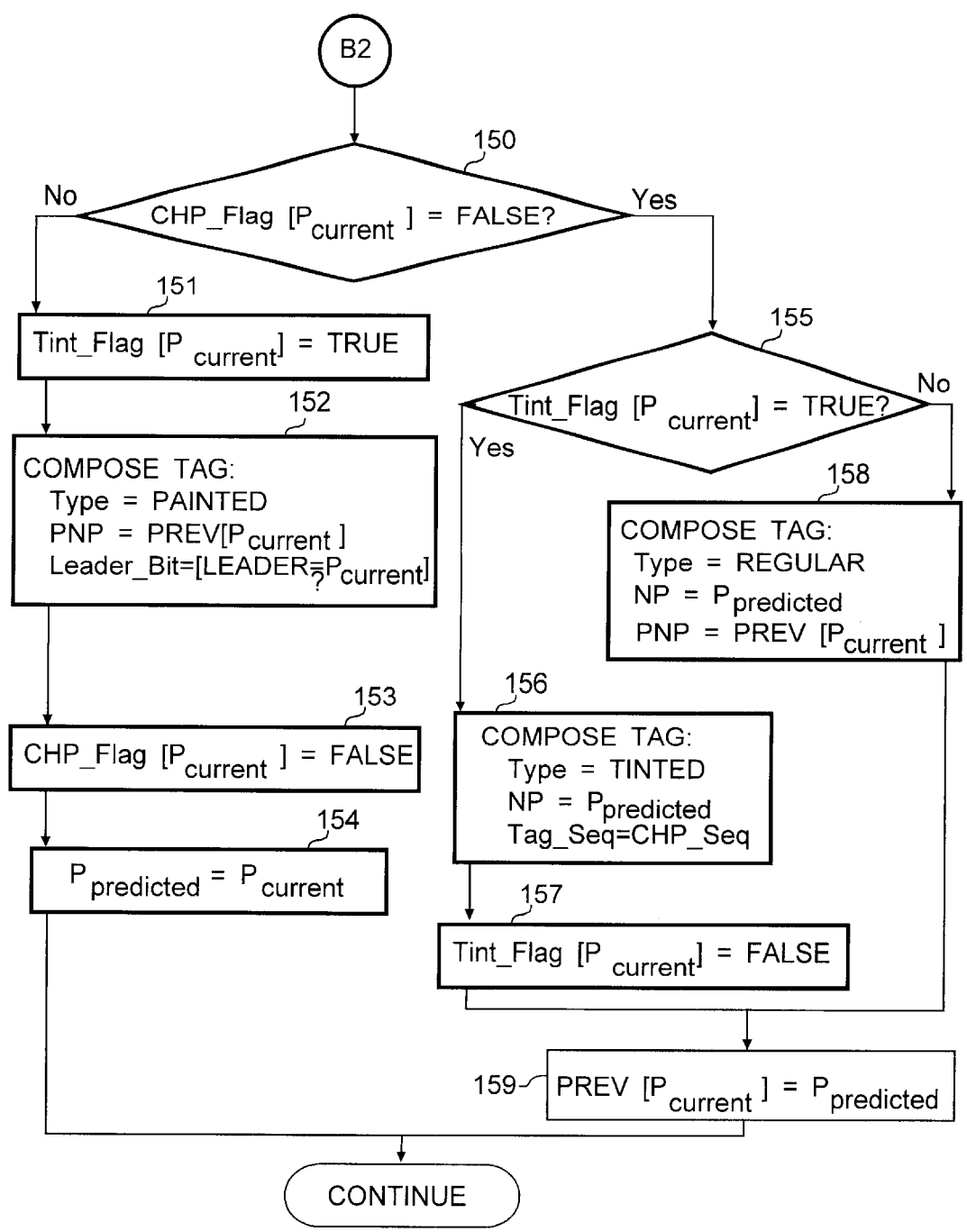

The flowchart in FIG. 13E refers to the Reduced Format version 2, starting with the termination B2. The operation of diamond 150 is similar to the one of diamond 130. If the value of CHP_Flag associated with $P_{current}$ is set, it proceeds to step 151, otherwise to diamond 155. In step 151, the process sets the value of the Tint_Flag register corresponding to $P_{current}$, in order to indicate that the next packet is to be of the type TINTED. Thus, in this version of AFRM, each new frame results in the marking of two successive packets on each of the switching paths, the first packet marked as PAINTED, and the next as TINTED, with the two packets carrying all the information of the fields of the General Format, in their shared fields. Next, in step 152, the type of the packet tag is set to PAINTED and the Leader_Bit and PNP fields are set in the same fashion as in step 132. Following that, the steps 153 and 154 are identical to steps 144 and 146 respectively of the previous format. In diamond 155, the process checks the value of Tint_Flag associated with the switching path referred to by the variable $P_{current}$. If the Tint_Flag has been set, it concludes that the checkpoint operation is still in progress and the hence proceeds to step 156, otherwise it proceeds to step 158. In step 156, the type of the packet tag is set to TINTED and the NP and Tag_Seq fields are set in the same fashion as in step 132. Following that, in step 157, the Tint-Flag is reset, indicating the completion of the checkpoint operation for the current frame. The step 158 is identical to step 133 of the General Format. Following both steps 157 and 158, the process goes to step 159, where the value of PREV is updated to $P_{predicted}$. Next, the process continues to the step 124 of FIG. 13B.

Figure 13F:
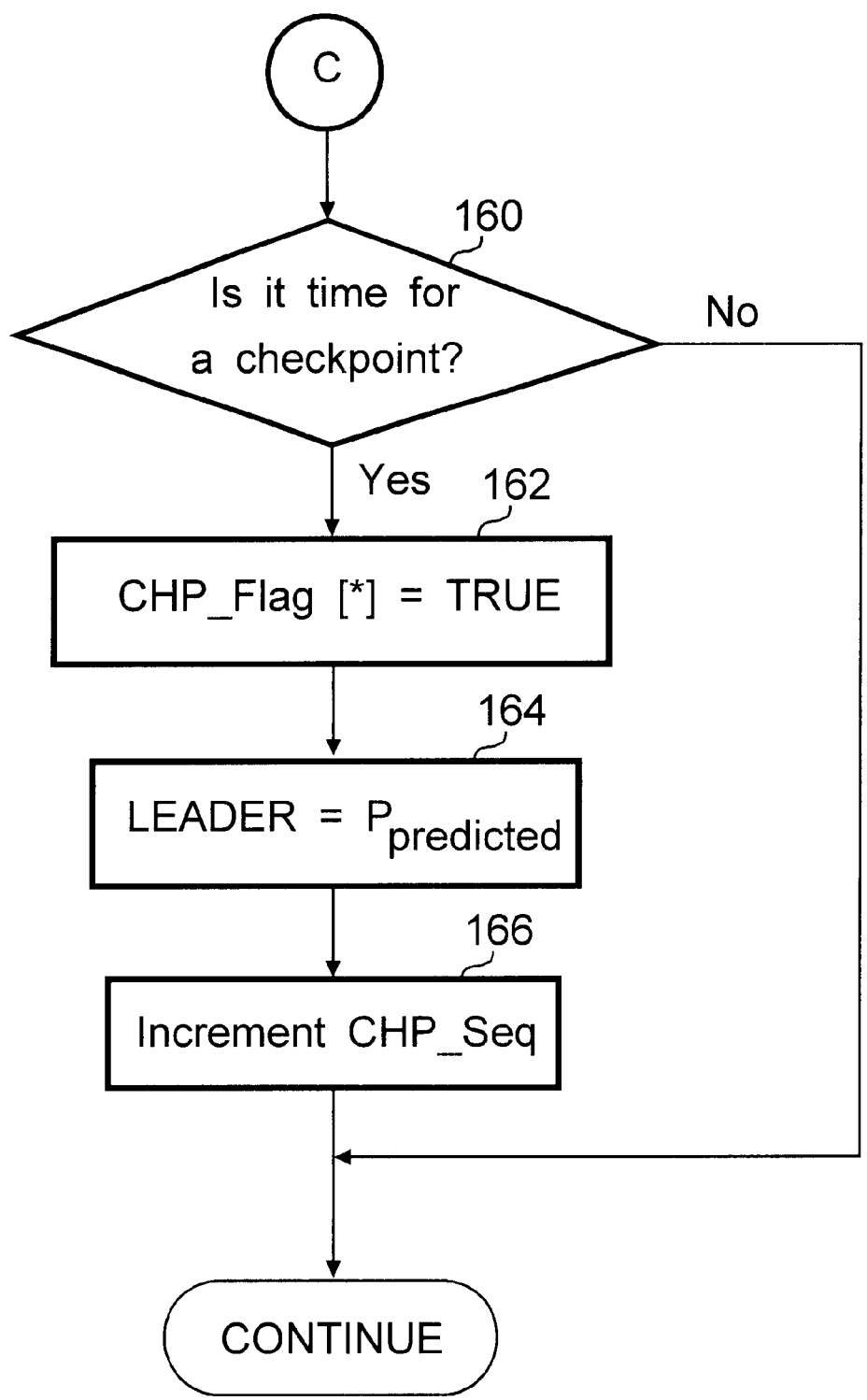

The flowchart in FIG. 13F, starting with the termination C, describes the initialization of the checkpoint operation and is the same for all the formats of AFRM. In step 160, the controller makes the decision if it is time to insert a new checkpoint, that is, start a new frame. Checkpoint insertion does not necessarily have to follow a periodic pattern. Instead, the checkpoints may follow, for example, the boundaries of the transport layer protocol frames. If it is not time to start a new frame, the process continues to the diamond 127 of FIG. 13B. If, however, the decision is affirmative, the values in the array of registers CHP_Flag are set, for all the switching paths, in step 162. Following that, the value of LEADER is set to $P_{predicted}$ in step 164, indicating that the very next packet for this NC will denote the beginning of a new frame. Next, the value of CHP_Seq is incremented using modulo arithmetic in step 166, to be used at the next checkpoint. The process then continues to the diamond 127 of FIG. 13B.

AFRM Egress Operations

Figure 14A:
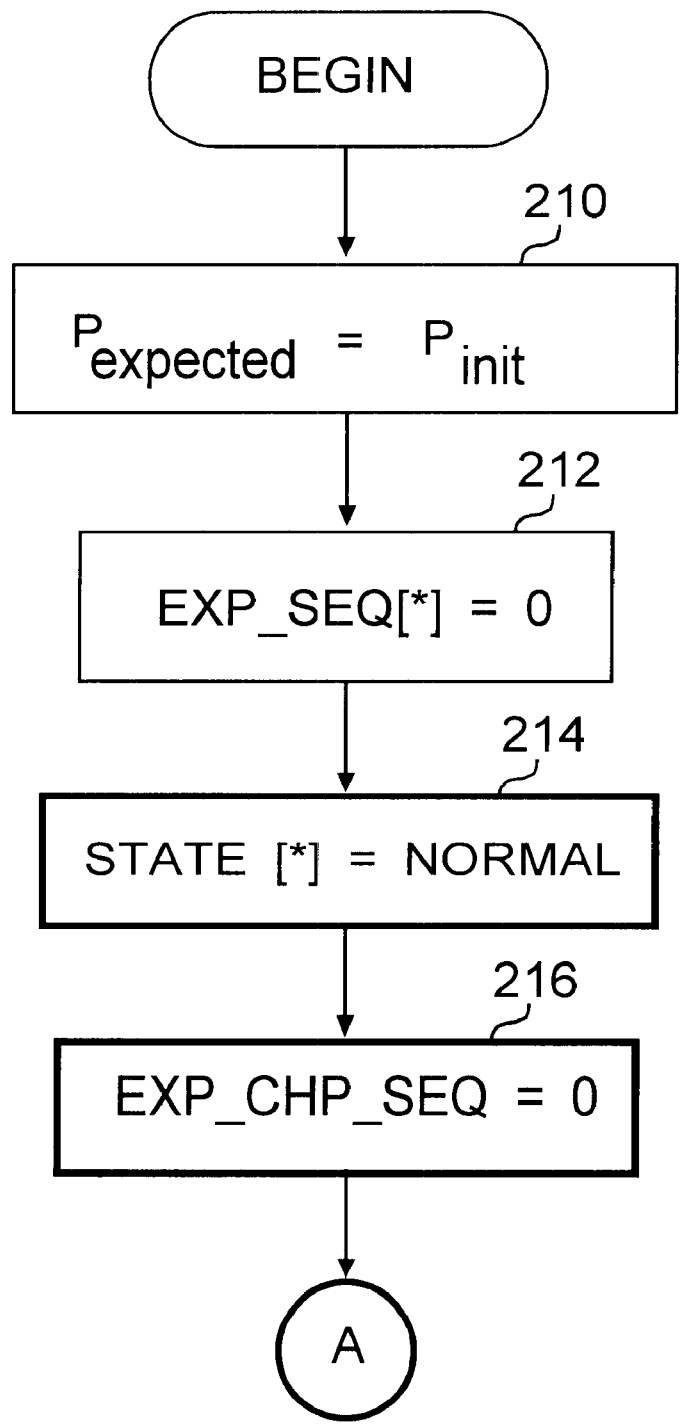
FIGS. 14A–14I are flow charts depicting preferred embodiments of the output controller advanced frame recovery functions and procedures.

FIG. 14A shows the steps in the initialization of the egress SCIMA/AFRM controller. The process begins with steps 210 and 212, which are part of the regular SC operations, where the variable $P_{expected}$ is initialized to the same value as in step 114 of FIG. 13A and the array of registers EXP_SEQ, one value for each switching path, are initialized to 0, respectively. The variable $P_{expected}$ is used by the egress SCIMA controller to determine which re-assembly queue from the plurality of queues, associated with the switching paths, to poll next in order to re-assemble the packets for the NC. The values in EXP_SEQ indicate the sequence number to expect in the tag of the first packet in each of the corresponding re-assembly queues, in the case of no packet loss. Following the above step, the values in the array State are initialized to NORMAL in step 214 and the value EXP_CHP_SEQ, which keeps track of the current frame number (during the re-assembly process), is set to 0 in step 216. There are four possible values for the entries in the array State, namely, NORMAL, IN_AFRM, WAIT and IDLE, each of which will be described later.

Figure 14B:
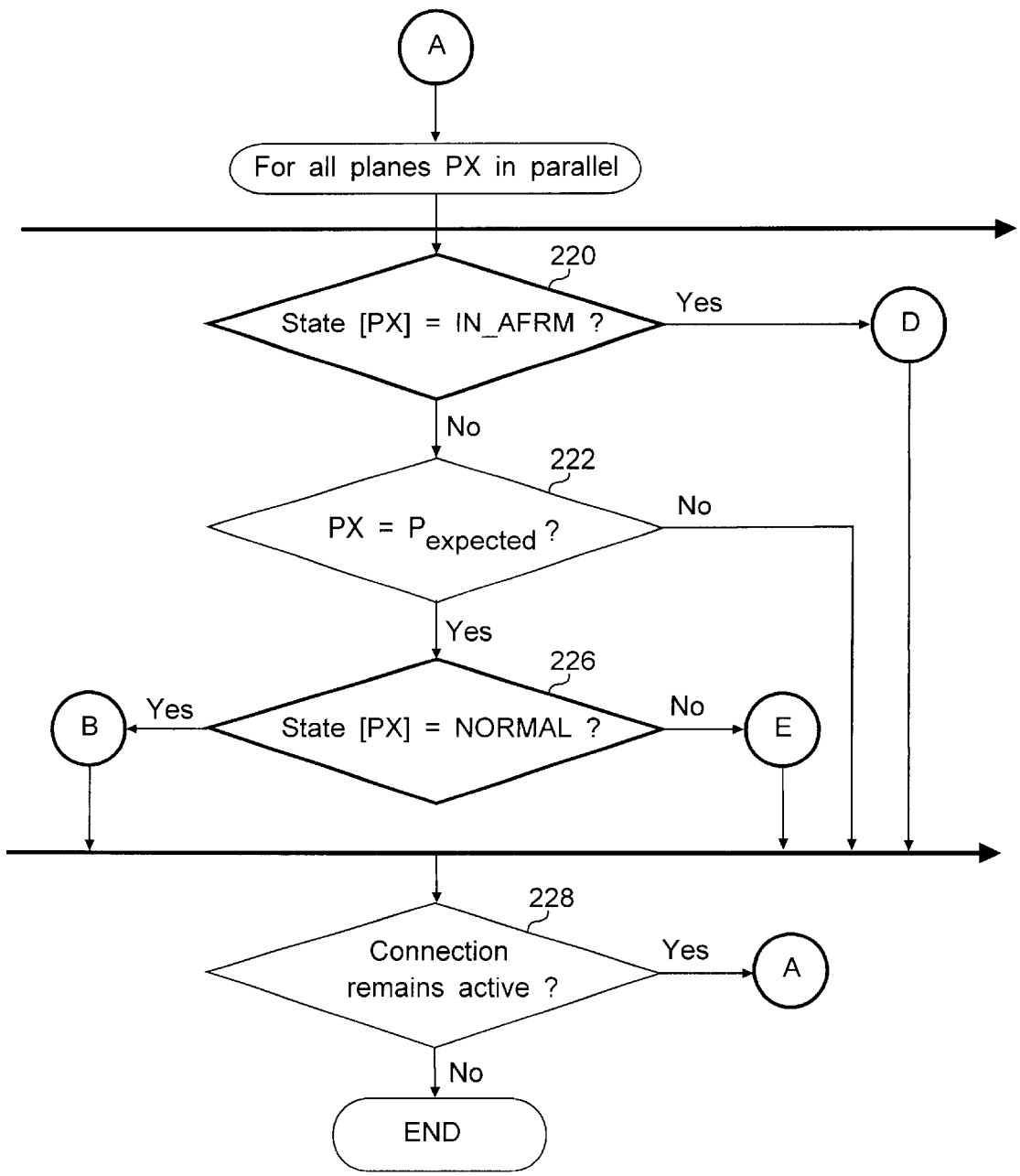
Figure 14C:
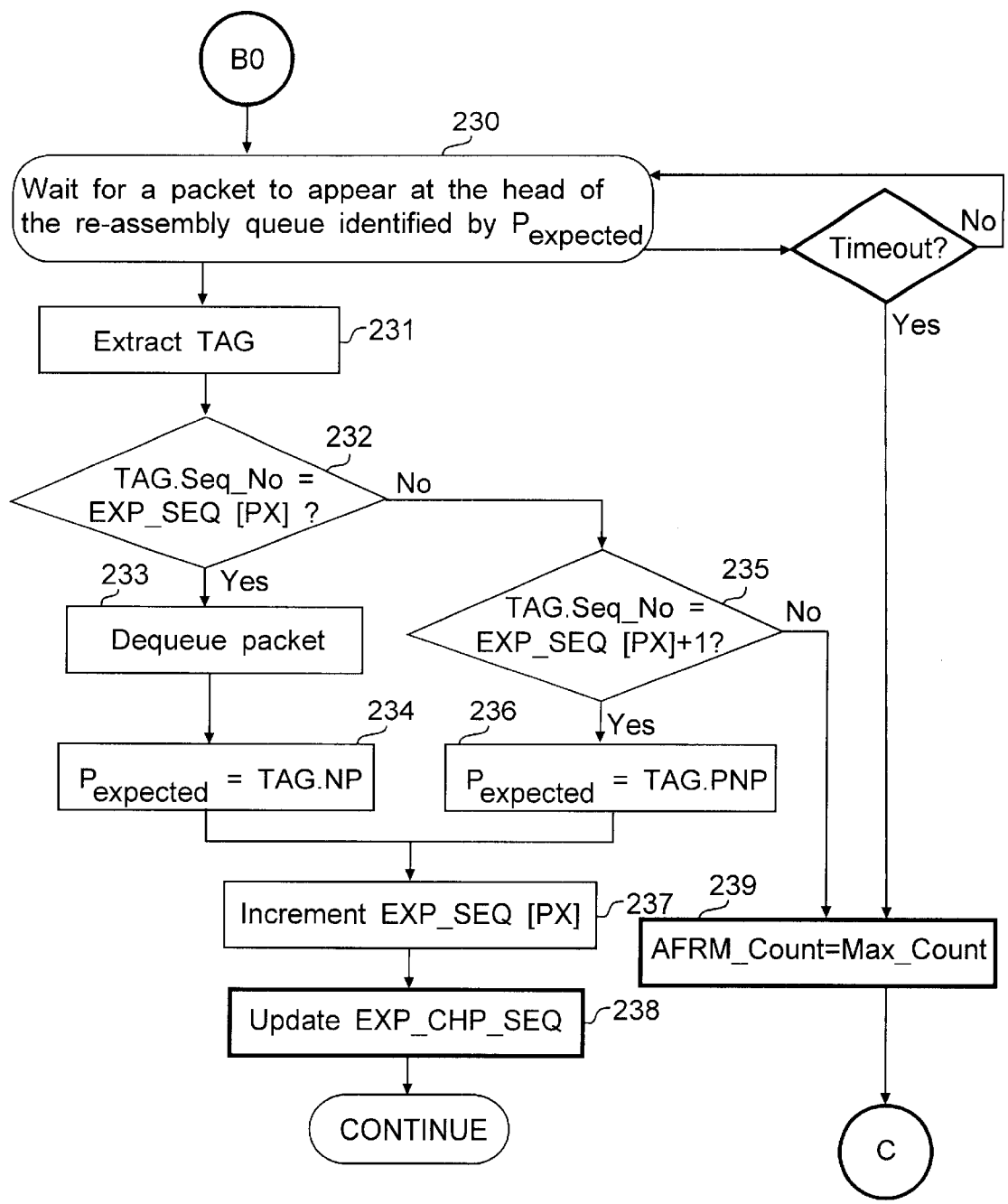

Following termination A to diamond 220 in FIG. 14B, the egress controller keeps checking all the values of the State register array, in parallel. For the switching path corresponding to the index PX, if the value of State[PX] is equal to IN_AFRM, it indicates that the switching path is inside the AFRM processing state, and proceeds to termination D. Otherwise, it indicates that at least one of the switching paths is not in the AFRM processing state and the process goes to diamond 222. This is part of the regular polling operation of the egress SCIMA controller, and if the index PX matches the current value of $P_{expected}$, then it proceeds to diamond 226, otherwise to diamond 228. In diamond 226, the controller checks whether the value of State[PX] is NORMAL, and if so, proceeds to termination B, otherwise it concludes that the switching path corresponding to PX is still waiting for an earlier checkpoint operation to complete, and hence, the controller proceeds to termination E. In the diamond 228, if the connection is still active, the process loops back to termination A.

The steps following termination B depend on the version of AFRM used by the controller. Hence, termination B has three alternative forms B0, B1 and B2. Termination B0 in FIG. 14C refers to the General Format of AFRM. Starting with step 230, the egress SCIMA controller waits for a packet to appear at the head of the re-assembly queue identified by $P_{expected}$. On a time-out event, it proceeds to step 239, whereas on detecting a packet at the head of the queue, it proceeds to step 231. In step 231, the controller extracts the tag from the packet and proceeds to the diamond 232, where it checks to see if the Seq_No field in the tag matches the EXP_SEQ value contained in the register corresponding to the switching path identified by PX. If the values match, it proceeds to step 233, otherwise to the diamond 235. In step 233, the controller de-queues the packet, and in step 234 sets the value of $P_{expected}$, which is the next switching path to poll, to the value in the NP field of the tag. It then proceeds to step 237. In diamond 235, the controller checks to see if the EXP_SEQ value and the Seq_No field differ by 1 and, if so, proceeds to step 236, indicating that there has been a single packet loss in this switching path, otherwise it proceeds to step 239. In step 236, the controller does not de-queue the packet, instead it updates the value of $P_{expected}$ to the PNP field of the packet tag. It then proceeds to step 237, where the EXP_SEQ value is incremented using modulo arithmetic. Note that the steps numbered 230 to 237 are all part of the regular SCIMA operations at the egress controller. Following that, the controller updates the EXP_CHP_SEQ value in step 238, if the de-queued packet was the first packet of a new frame, as indicated by a PAINTED tag type and a set Leader_Bit field, and then continues to the step 228 of FIG. 14B. Step 239 indicates the invocation of the AFRM, and is carried out either in the case of a time-out event or if the controller detects a severe packet loss (diamond 235). In this step, the variable AFRM_Count, which keeps track of the number of consecutive times AFRM is invoked, is set to a maximum value. The controller then proceeds to termination C.

Figure 14D:
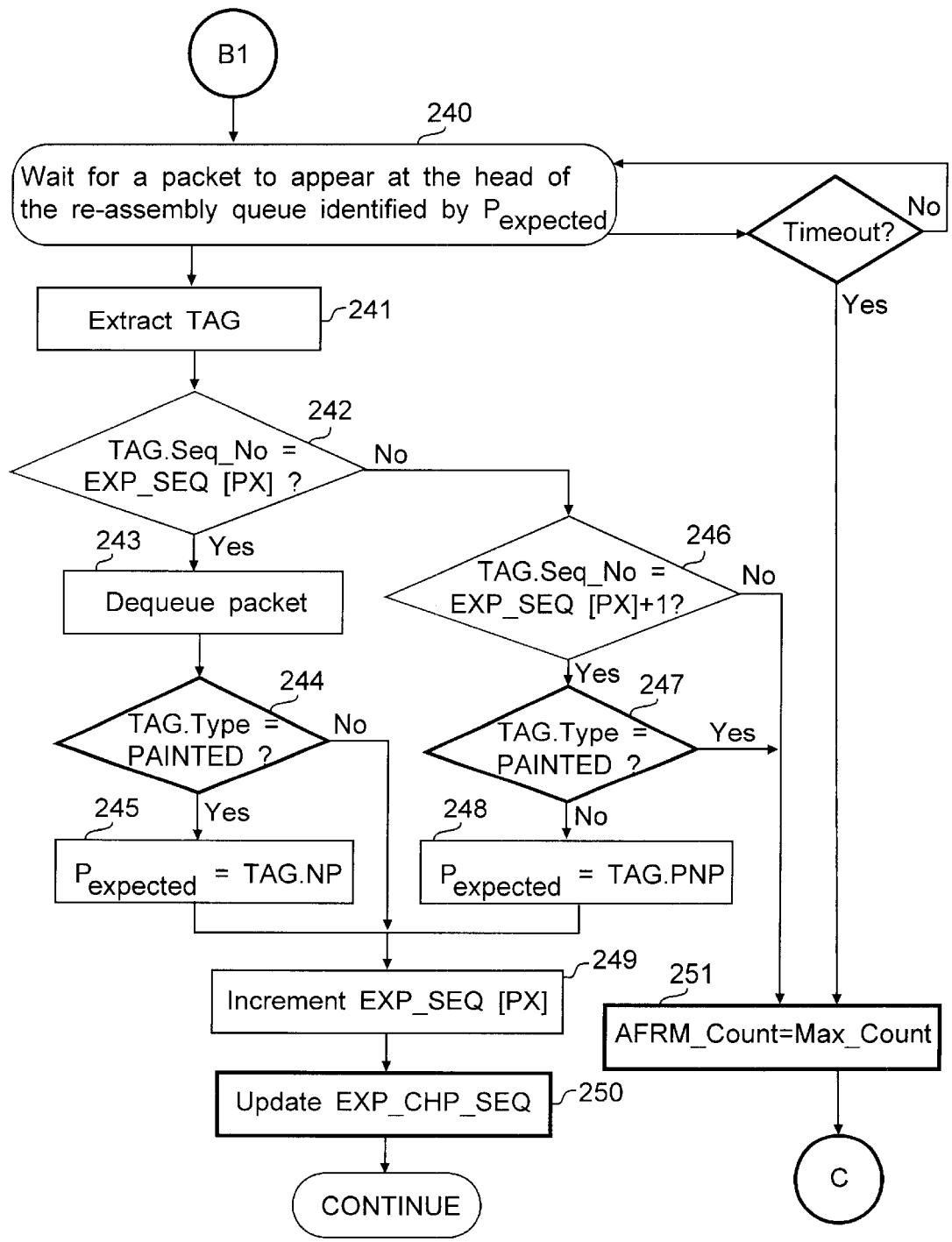

Termination B1, starting with step 240 in FIG. 14D refers to the Reduced Format version 1. Steps numbered 240 to 243 are identical in operation to steps 230 to 233, except that diamond 242 leads to diamond 246 in case there is a mismatch between the above said Tag_Seq and EXP_SEQ values. In diamond 244, if the packet tag is of type PAINTED, the controller leaves the $P_{expected}$ value unchanged because the ingress controller in this format nullifies the adaptive dispatch module's choice of $P_{expected}$ for the packet that follows this packet, and proceeds to step 249, otherwise it updates in step 245 the value of $P_{expected}$ to the NP field of the packet tag, then proceeds to step 249. The check made for a single packet loss for this switching path in diamond 246 is identical to the check in diamond 23 5. In case of a severe loss, the controller proceeds to step 251, otherwise to step 247, where it checks to see if the type of the tag is PAINTED. If that is the case, it means that the single packet loss cannot be recovered in regular SCIMA operation as the PAINTED tag does not contain the PNP field, and hence, it proceeds to step 251. Otherwise, it updates the value of $P_{expected}$ to the PNP field of the tag without de-queuing the packet in step 248, and then proceeds to step 249. Steps 249 and 250 are identical to steps 237 and 238 of FIG. 13C, and the step 251 is identical to the step 239 of FIG. 14C.

Figure 14E:
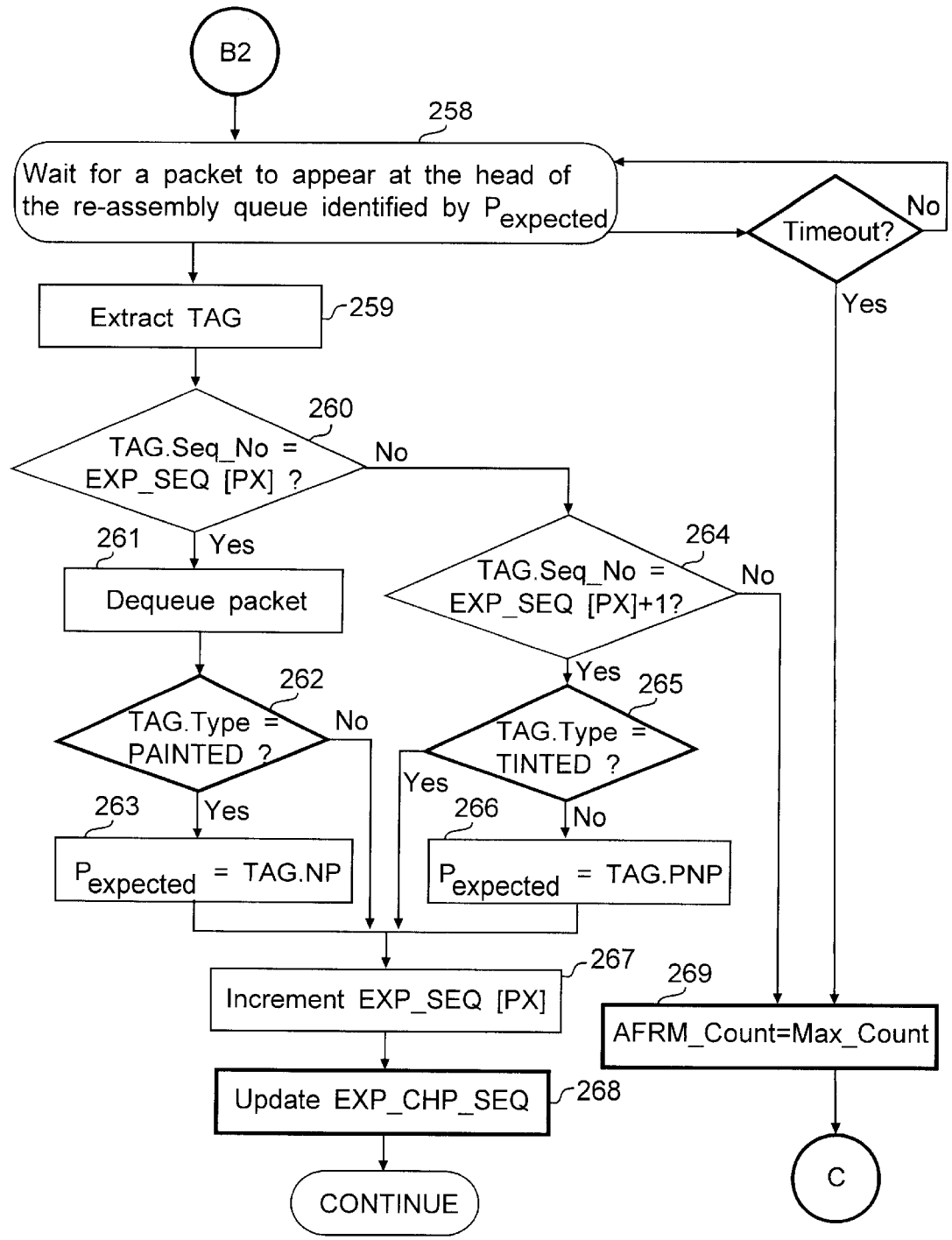

Termination B2, starting with step 258 in FIG. 14E refers to the Reduced Format version 2. Steps numbered 258 to 261 are identical in operation to steps 230 to 233, except that diamond 260 leads to diamond 264 in case there is a mismatch between the above said Tag_Seq and EXP_SEQ values. In diamond 262, if the packet tag is of type PAINTED, the controller leaves the $P_{expected}$ value unchanged, and proceeds to step 267, otherwise it updates the value of $P_{expected}$ to the NP field of the packet tag, then proceeds to step 267. The check made for a single packet loss for this switching path in diamond 264 is identical to the check in diamond 235. In case of a severe loss, the controller proceeds to step 269, otherwise to step 265, where it checks to see if the type of the tag is TINTED. If that is the case, it means the single packet lost was of type PAINTED and it leaves the value of $P_{expected}$ unchanged; otherwise, it updates the value of $P_{expected}$ to the PNP field of the tag in step 266; in both cases without de-queuing the packet, and then proceeds to step 267. Steps 267 and 268 are identical to steps 237 and 238 of FIG. 14C, and the step 269 is identical to the step 239 of FIG. 14C.

Figure 14F:
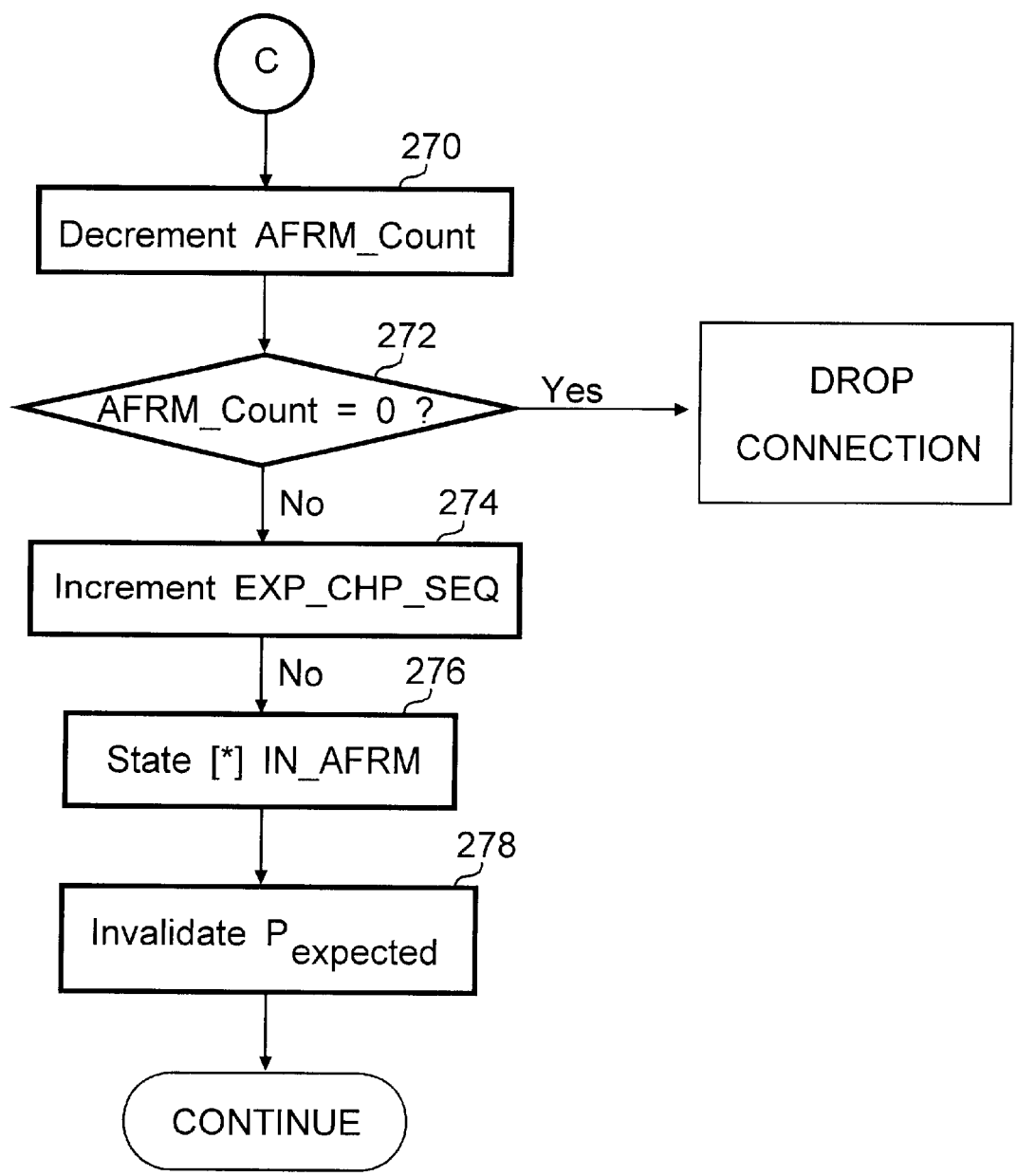

The flowchart in FIG. 14F, starting at termination C and step 270, is uniform for all the formats of AFRM and shows the steps involved in the initialization of every instance of the AFRM mode. In step 270, the AFRM_Count variable is decremented. If the AFRM_Count goes to 0 in diamond 272, indicating too many successive invocations of the AFRM mode, the connection is dropped. Otherwise, the EXP_CHP_SEQ is incremented using modulo arithmetic in step 274. This value indicates the frame number that will be used by the egress controller to align the packets in all of the switching paths. The State variable is set to IN_AFRM in step 276, for all the switching paths for the NC. Finally, in step 278, the value of $P_{expected}$ is invalidated. It remains invalid until a new checkpoint indicating a frame leader is identified, in order to prevent the egress SCIMA controller from continuing its regular polling operations to de-queue packets. Following that, the process continues to the step 228 of FIG. 14B.

The steps following termination D depend upon the version of AFRM used by the controller. Hence, termination D has two alternative forms, D in FIG. 14G referring to the General Format as well as the Reduced Format version 1, and D2 in FIG. 13H referring to the Reduced Format version 2. The FIGS. 14G and 14H show the operations involved in the egress controller in order to process the IN_AFRM state.

Figure 14G:
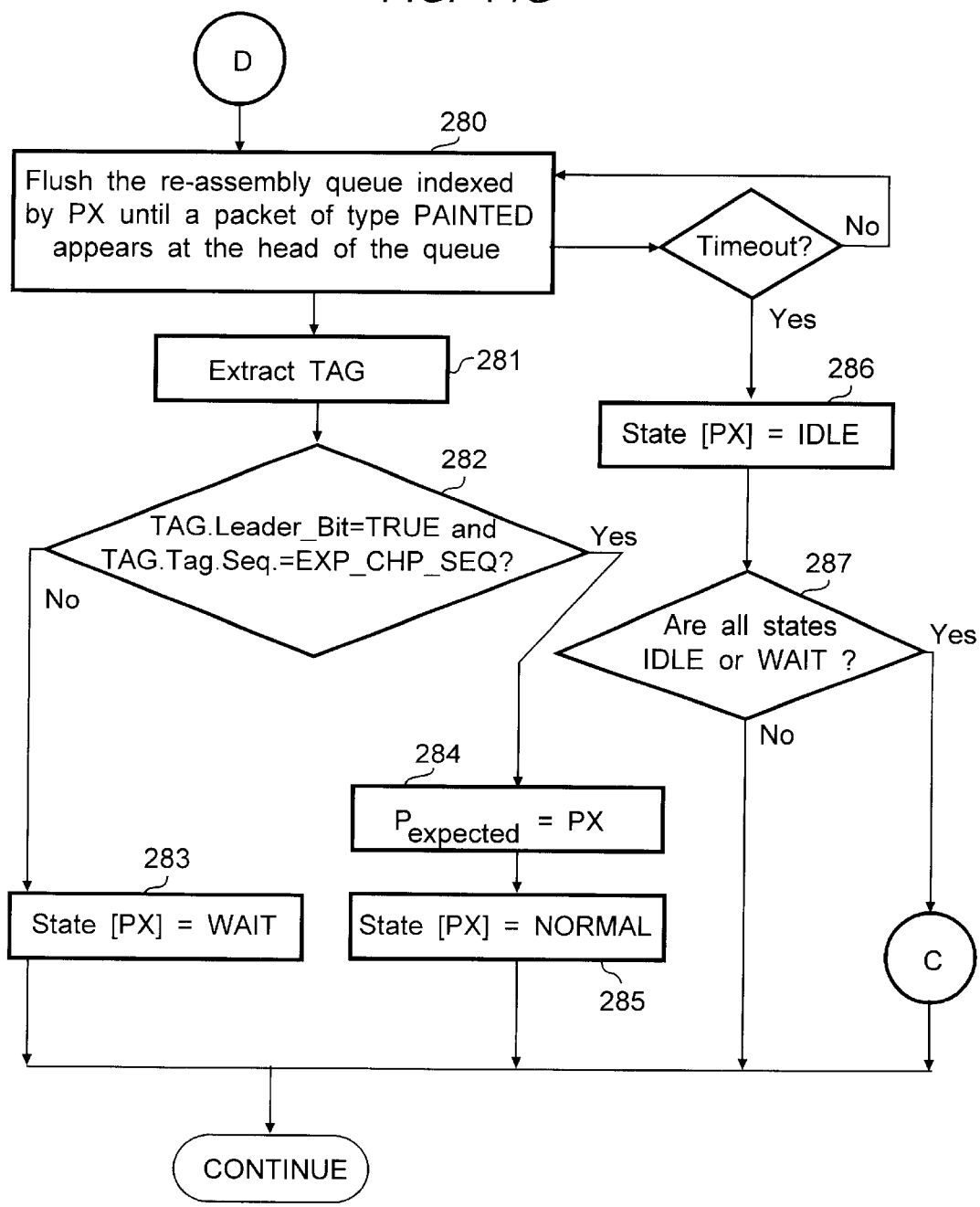

In step 280 following termination D in FIG. 14G, the controller flushes the re-assembly queue indexed by PX until it detects a packet with a tag of type PAINTED at the head of the queue. On a time-out event, the value of State[PX] is set to IDLE in step 286, indicating that the queue was empty for a long duration while the controller was polling for a PAINTED packet. Following step 286, if all the values in the array State are detected to be either IDLE or WAIT in diamond 287, the controller re-enters the AFRM mode by proceeding to termination C. Otherwise, it continues to step 228 of FIG. 14B. If a PAINTED packet is successfully detected at the head of the queue in step 280, the process extracts the tag of this packet in step 281, and proceeds to diamond 282. Here, the controller checks to see if the Tag_Seq field in the packet tag matches the expected value of the frame number contained in EXP_CHP_SEQ, and if the Leader_Bit in the tag is set. If both determinations are affirmative, the controller concludes that it has detected the beginning of a new frame and proceeds to step 284, otherwise, it changes the State value to WAIT in step 283 and continues to step 228 of FIG. 14B. In step 284, the AFRM mode is concluded for this switching path and the value of $P_{expected}$ is set to PX (validated), followed by an update of the State value to NORMAL in step 285. It then continues to step 228 of FIG. 14B.

Figure 14H:
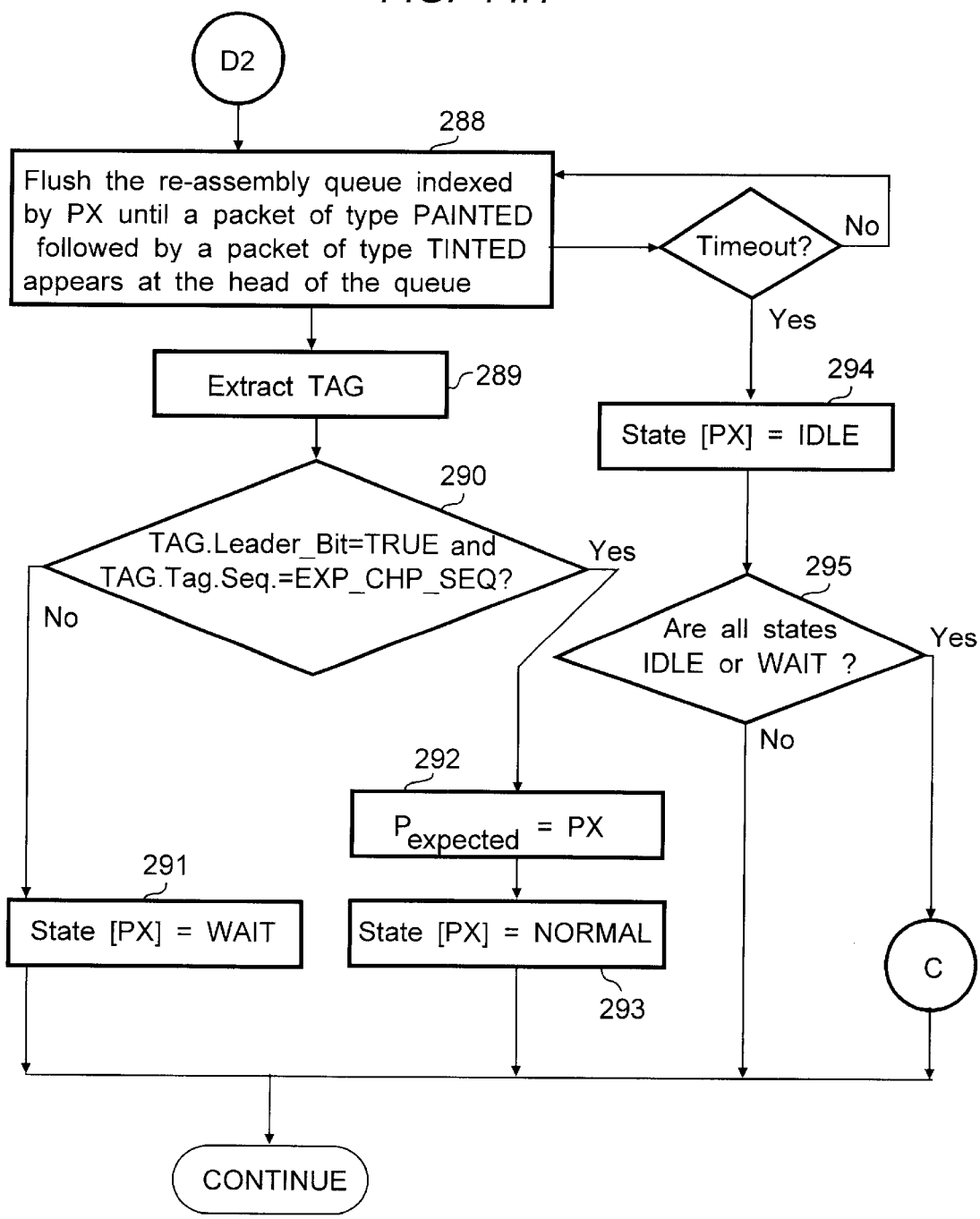

The flowchart in FIG. 14H refers to the AFRM processing in the Reduced Format version 2. In step 288, following termination D2, the controller flushes the re-assembly queue indexed by PX until it detects two back-to-back packets at its head that are of type PAINTED and TINTED, respectively. On a time-out, it proceeds to step 294. Steps 294 and 295 are identical to steps 286 and 287 of FIG. 14G. On success in step 288, the controller extracts the tags of the first two packets in the queue in step 289. (Recall that, in this format, both the PAINTED and TINTED packets are necessary to complete a single checkpoint.) Following that, in diamond 290, it checks to see if the tag from the PAINTED packet has the Leader_Bit set, and if the tag from the TINTED packet has a value of Tag_Seq that matches the expected frame number EXP_CHP_SEQ. If both determinations are affirmative, the controller concludes that it has detected the beginning of a new frame and proceeds to step 292, otherwise, it changes the State value to WAIT in step 291 and continues to step 228 of FIG. 13B. Steps 292 and 293 are identical to steps 284 and 285, respectively, of FIG. 14G.

Figure 14I:
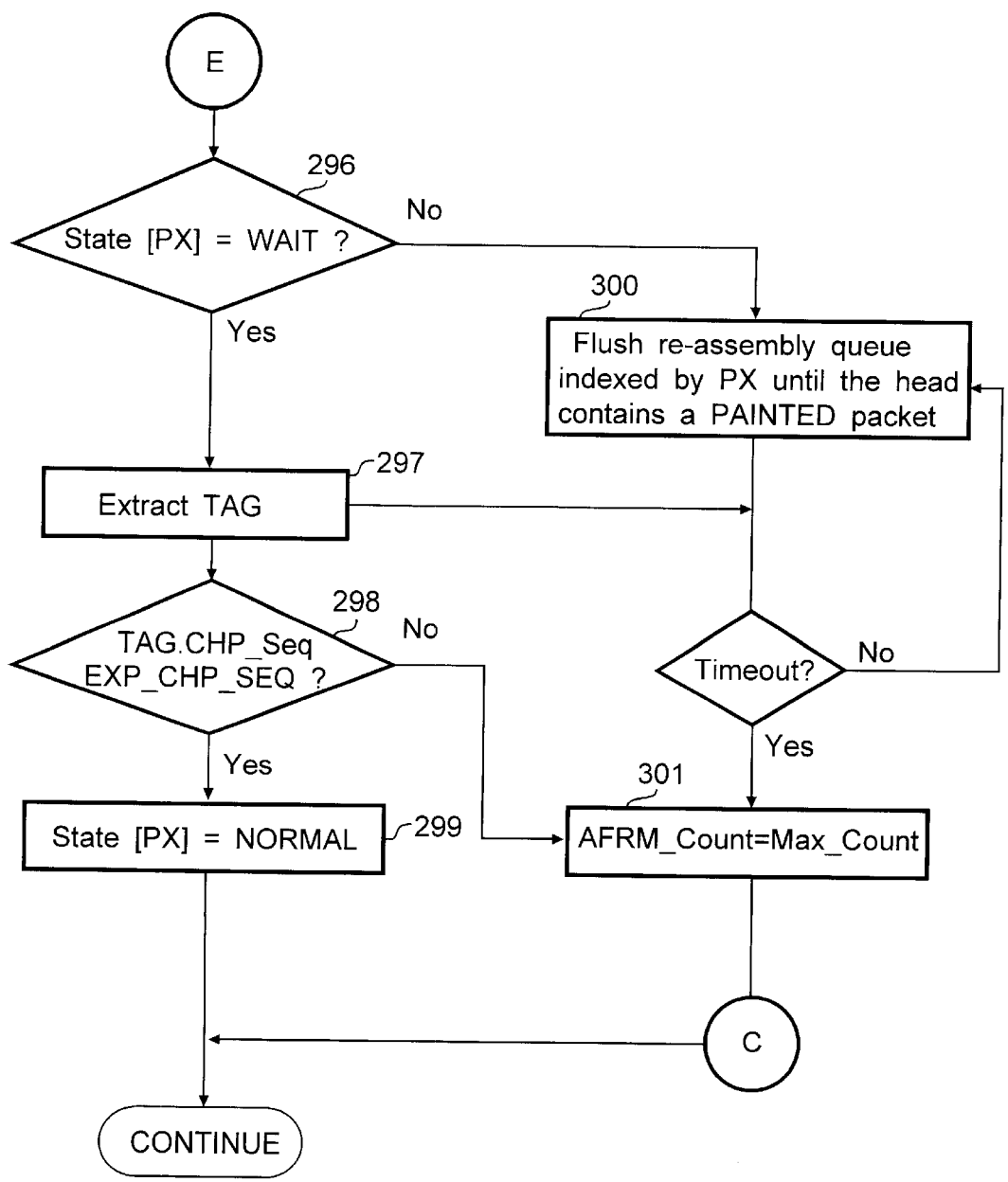

Finally, the flowchart in FIG. 14I shows the processing of the WAIT and IDLE states at the egress controller, and is the same for all the AFRM formats. Following termination E to step 296, the controller checks to see if the State value corresponding to the switching path indexed by PX is WAIT. If so, it proceeds to step 297, otherwise, it proceeds to step 300. In step 297, it extracts the tag of the packet at the head of the re-assembly queue indexed by PX. Reaching the step 297 already implies that the tag is of type PAINTED, that the State had been updated to WAIT during an earlier processing of the IN_AFRM state for that switching path, and that a set Leader_Bit has been found from a packet in another switching path as the $P_{expected}$ is valid. Following to diamond 298, the controller then checks to see if the Tag_Seq field of the packet tag matches the frame number EXT_CHP_SEQ (which was evidently matched by an earlier packet which was the leader of this frame). On a successful match, it restores the State value to NORMAL in step 299, otherwise, it proceeds to step 301.

Reaching the step 300 implies that the tag is of type IDLE, that the State had been updated to IDLE during a time-out event while processing an earlier IN_AFRM state-for that switching path, and that a set Leader_Bit has since been found from a packet in another switching path. In step 300, the controller flushes the queue until it detects a packet at the head of the queue that has a tag of type PAINTED. On a time-out, it proceeds to step 301. If it detects a PAINTED tag, it proceeds to step 297 in order to attempt the same set of operations involved in the processing of the WAIT state. In step 301, since the switching path could not align with the expected frame number, a new series of AFRM is invoked by setting the AFRM_Count to a maximum value, and then proceeding to termination C.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A packet switching system, comprising:
a core switching network having kN input ports and kN output ports, the core switching network providing a plurality of switching paths for data packets between the kN input ports and the kN output ports, each of the plurality of switching paths connecting one of the kN input ports to one of the kN output ports;
a group of N input controllers, each of the group of N input controllers being attached to k input ports of the core switching network and providing an interface for an input communication link carrying an input stream of data packets, each of the group of N input controllers being configured to partition the input stream of data packets into a sequence of asynchronous frames using a sequence of marked data packets prior to transmitting a resulting stream of data packets into the k input ports of the core switching network; and
a group of N output controllers, each of the group of N output controllers being attached to k output ports of the core switching network and providing an interface for an output communication link carrying an output stream of data packets, each of the group of N output controllers being configured to reassemble a received stream of data packets from the k output ports into the output stream of data packets.

2. A method for resorting a flow of data packets in a packet switching system comprising the steps of:
attaching an advanced frame recovery mode checkpoint to each inverse multiplexing tag in the flow of data packets;
saving the advanced frame recovery mode checkpoint of each of the flow of data packets discarded by the packet switching system; and
resorting successfully delivered ones of the flow of data packets based upon the advanced frame recovery mode checkpoints of the successfully delivered ones of the flow of data packets and the saved advanced frame recovery mode checkpoints of the discarded data packets.

3. The method of claim 2, wherein the packet switching system has a plurality of input ports, a plurality of output ports, and a plurality of switching paths between the input ports and the output ports, each of the switching paths connecting one of the input ports to one of the output ports and having a first queue and a second queue, and wherein the step of resorting successfully delivered ones of the flow of data packets comprises the steps of:
storing the data packets successfully delivered over each of the switching paths in the first queue associated therewith; and
storing the saved advanced frame recovery mode checkpoints of the data packets discarded over each of the switching paths in the second queue associated therewith.

4. A method for restoring a flow of data packets in a packet switching system, the packet switching system having a core switching network, said method comprising the steps of:
providing a first flow of data packets to the core switching network;
inserting sequentially numbered checkpoints into the first flow of data packets, to partition the first flow of data packets into a sequence of asynchronous frames;
providing a second flow of data packets from the core switching network; and
utilizing the sequentially numbered checkpoints to discard one asynchronous frame of the sequence of asynchronous frames when data packet losses occur in the core switching network.

5. The system of claim 1, wherein the resulting stream of data packets is transmitted into the k input ports of the core switching network using a switched connection inverse multiplexing over ATM format, the sequence of marked data packets is appended to a sequence of switched connection inverse multiplexing over ATM control fields, and the output stream of data packets is reassembled using the switched connection inverse multiplexing over ATM format.

6. The system of claim 5, wherein each of the sequence of marked data packets identifying each of the sequence of asynchronous frames is a leader data packet that is generated by painting using a first mark, a first data packet transmitted into one of the k input ports of the core switching network.

7. The system of claim 5, wherein each of the sequence of synchronous frames is partitioned into a sequence of subframes, each subframe being identified by painting using a second mark, a first data packet transmitted into one of the input ports of the core switching network.

8. The system of claim 7, wherein upon failure of reassembly of the output stream of data packets using the switched connection inverse multiplexing over ATM format, the sequence of painted data packets is used to discard one or more asynchronous frames, and identify the start of the first asynchronous frame following the discarded one or more asynchronous frames.

9. The method of claim 4, wherein each asynchronous frame of the sequence of asynchronous frames is partitioned into subframes, a first packet of each subframe is configured to be a painted packet, and the painted packet of the first subframe is configured as a leader packet.

10. The method of claim 9, wherein discarding one asynchronous frame of the sequence of asynchronous frames is carried out using the first numbered checkpoint of the sequentially numbered checkpoints and a following second numbered checkpoint of the sequentially numbered checkpoints.

11. The method of claim 10, wherein the data packet losses occurring in the core switching network is detected independently of the sequence of numbered checkpoints.

12. The method of claim 10, wherein the data packet losses occurring in the core switching network is detected using the sequentially numbered checkpoints.

* * * * *